US012549364B2

United States Patent
Connard

(10) Patent No.: US 12,549,364 B2
(45) Date of Patent: Feb. 10, 2026

(54) APPARATUSES, METHODS, AND COMPUTER PROGRAM PRODUCTS FOR PROVIDING DATA ACCESS AUTHENTICATION FOR A DATA PARTITION BASED ON ENCRYPTED CONTEXT ASSOCIATED WITH A DATA ACCESS REQUEST

(71) Applicant: ATLASSIAN PTY LTD, Sydney (AU)

(72) Inventor: David Connard, Sydney (AU)

(73) Assignee: ATLASSIAN PTY, LTD., Sydney (AU)

( * ) Notice: Subject to any disclaimer, the term of this patent is extended or adjusted under 35 U.S.C. 154(b) by 49 days.

(21) Appl. No.: 18/756,221

(22) Filed: Jun. 27, 2024

(65) Prior Publication Data

US 2026/0005858 A1    Jan. 1, 2026

(51) Int. Cl.
*H04L 29/06* (2006.01)
*H04L 9/08* (2006.01)
*H04L 9/32* (2006.01)

(52) U.S. Cl.
CPC .............. *H04L 9/32* (2013.01); *H04L 9/0861* (2013.01)

(58) Field of Classification Search
None
See application file for complete search history.

(56) References Cited

U.S. PATENT DOCUMENTS

| | | | | |
|---|---|---|---|---|
| 2007/0118733 | A1* | 5/2007 | Boogert | H04L 9/0891 713/155 |
| 2009/0262929 | A1* | 10/2009 | Walmsley | G06F 21/85 380/46 |
| 2009/0320118 | A1* | 12/2009 | Muller | G06F 21/34 726/9 |

(Continued)

OTHER PUBLICATIONS

Goyal, Deepanshu; Krishna, M. Bala. Secure framework for data access using Location based service in Mobile Cloud Computing. 015 Annual IEEE India Conference (INDICON). https://ieeexplore.ieee.org/stamp/stamp.jsp?tp=&arnumber=7443761 (Year: 2015).*

(Continued)

*Primary Examiner* — Jeremiah L Avery
(74) *Attorney, Agent, or Firm* — Alston & Bird LLP

(57) ABSTRACT

Methods, apparatuses, or computer program products that provide data access authentication for a data partition based on encrypted context associated with a data access request for the data partition. In some examples, a data access request to access data within a partition is received. In some examples, the data access request is associated with an encrypted context for a requesting entity identifier associated with the data access request. In some examples, a partition identifier and an encrypted partition key for the partition are identified based on the data access request. Additionally, a candidate validation partition key for the partition is generated based on the encrypted partition key, the encrypted context, and the partition identifier. In some examples, the candidate validation partition key is validated (Continued)

based on a comparison between the candidate validation partition key and a validation partition key associated with the partition to facilitate processing the data access request.

20 Claims, 10 Drawing Sheets

(56) References Cited

U.S. PATENT DOCUMENTS

| | | | | |
|---|---|---|---|---|
| 2015/0143125 | A1* | 5/2015 | Nix | H04L 9/3239 |
| | | | | 713/171 |
| 2017/0061138 | A1* | 3/2017 | Lambert | H04L 63/18 |
| 2018/0091298 | A1* | 3/2018 | Saurav | H04L 9/0861 |
| 2018/0241561 | A1* | 8/2018 | Albertson | H04L 63/06 |
| 2019/0097794 | A1* | 3/2019 | Nix | G06F 21/33 |
| 2019/0297064 | A1* | 9/2019 | Resch | H04L 9/3271 |
| 2020/0195427 | A1* | 6/2020 | Beck | H04L 9/0847 |
| 2021/0051002 | A1* | 2/2021 | Cheng | H04L 9/0819 |
| 2022/0377055 | A1* | 11/2022 | Liu | H04L 9/3247 |
| 2023/0274013 | A1* | 8/2023 | Madan | H04L 9/3239 |
| | | | | 726/26 |
| 2023/0291548 | A1* | 9/2023 | Mastenbrook | H04L 9/0825 |

OTHER PUBLICATIONS

Hu, Gang. Study of file encryption and decryption system using security key. 2010 2nd International Conference on Computer Engineering and Technology. https://ieeexplore.ieee.org/stamp/stamp.jsp?tp=&arnumber=5485326 (Year: 2010).*

Kashyap, Hirak; Chaves, Ricardo. Secure partial dynamic reconfiguration with unsecured external memory. 2014 24th International Conference on Field Programmable Logic and Applications (FPL). https://ieeexplore.ieee.org/stamp/stamp.jsp?tp=&arnumber=6927477 (Year: 2014).*

* cited by examiner

APPARATUSES, METHODS, AND COMPUTER PROGRAM PRODUCTS FOR PROVIDING DATA ACCESS AUTHENTICATION FOR A DATA PARTITION BASED ON ENCRYPTED CONTEXT ASSOCIATED WITH A DATA ACCESS REQUEST

BACKGROUND

It is often difficult to manage and/or support databases and/or data partitions of a server system in which inputs, components, data objects, and/or data storage requirements of the server system dynamically change. Through applied effort, ingenuity, and innovation, these identified deficiencies and problems have been solved by developing solutions that are configured in accordance with the embodiments of the present disclosure, many examples of which are described in detail herein.

BRIEF SUMMARY

In an embodiment, an apparatus comprises one or more processors and one or more storage devices storing instructions that are operable, when executed by the one or more processors, to cause the one or more processors to receive a data access request to access data within a partition, wherein the data access request is associated with an encrypted context for a requesting entity identifier associated with the data access request. In one or more embodiments, the instructions are additionally or alternatively operable, when executed by the one or more processors, to cause the one or more processors to identify, based at least in part on the data access request, a partition identifier and an encrypted partition key for the partition. In one or more embodiments, the instructions are additionally or alternatively operable, when executed by the one or more processors, to generate a candidate validation partition key for the partition based at least in part on the encrypted partition key, the encrypted context, and the partition identifier. In one or more embodiments, the instructions are additionally or alternatively operable, when executed by the one or more processors, to validate the candidate validation partition key based at least in part on a comparison between the candidate validation partition key and a validation partition key associated with the partition. In one or more embodiments, the instructions are additionally or alternatively operable, when executed by the one or more processors, to process the data access request in response to a determination that the candidate validation partition key is valid.

In another embodiment, a computer program product comprises at least one non-transitory computer-readable storage medium having computer-readable program code portions stored therein, where the computer-readable program code portions comprising an executable portion are configured to receive a data access request to access data within a partition, wherein the data access request is associated with an encrypted context for a requesting entity identifier associated with the data access request. In one or more embodiments, the computer-readable program code portions comprising an executable portion are additionally or alternatively configured to identify, based at least in part on the data access request, a partition identifier and an encrypted partition key for the partition. In one or more embodiments, the computer-readable program code portions comprising an executable portion are additionally or alternatively configured to generate a candidate validation partition key for the partition based at least in part on the encrypted partition key, the encrypted context, and the partition identifier. In one or more embodiments, the computer-readable program code portions comprising an executable portion are additionally or alternatively configured to validate the candidate validation partition key based at least in part on a comparison between the candidate validation partition key and a validation partition key associated with the partition. In one or more embodiments, the computer-readable program code portions comprising an executable portion are additionally or alternatively configured to process the data access request in response to a determination that the candidate validation partition key is valid.

In yet another embodiment, a computer-implemented method comprises receiving a data access request to access data within a partition, wherein the data access request is associated with an encrypted context for a requesting entity identifier associated with the data access request. In one or more embodiments, the computer-implemented method additionally or alternatively comprises identifying, based at least in part on the data access request, a partition identifier and an encrypted partition key for the partition. In one or more embodiments, the computer-implemented method additionally or alternatively comprises generating a candidate validation partition key for the partition based at least in part on the encrypted partition key, the encrypted context, and the partition identifier. In one or more embodiments, the computer-implemented method additionally or alternatively comprises validating the candidate validation partition key based at least in part on a comparison between the candidate validation partition key and a validation partition key associated with the partition. In one or more embodiments, the computer-implemented method additionally or alternatively comprises processing the data access request in response to a determination that the candidate validation partition key is valid.

Various other embodiments are also described in the following detailed description and in the attached claims.

BRIEF DESCRIPTION OF THE SEVERAL VIEW OF THE DRAWINGS

Having thus described some embodiments in general terms, references will now be made to the accompanying drawings, which are not drawn to scale, and wherein:

DETAILED DESCRIPTION OF VARIOUS EMBODIMENTS

Figure 1:
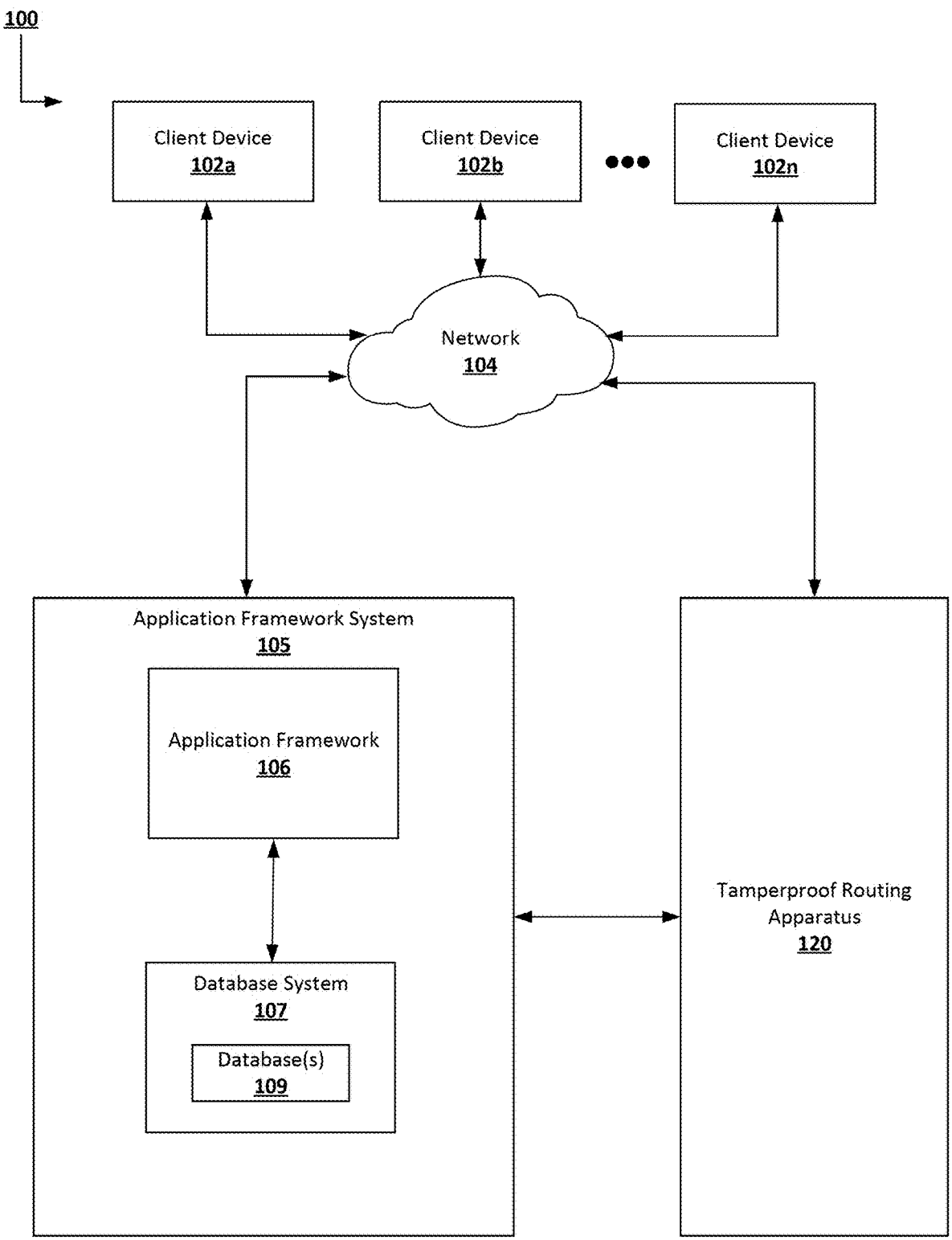
FIG. 1 is a block diagram of an example system within which one or more embodiments of the present disclosure may operate.

Various embodiments of the present disclosure will now be described more fully hereinafter with reference to the accompanying drawings, in which some, but not all embodiments of the present disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

Overview

Various embodiments of the present disclosure address technical problems associated with efficiently and reliably managing server systems such as, for example, managing databases, components, and/or data objects for a server system. The disclosed techniques may be provided by an apparatus integrated with an application framework where multiple components/resources and/or layers of components/resources interact with one another in several complex manners to provide collaborative applications and/or collaborative services. Various embodiments of the present disclosure additionally or alternatively address technical problems associated with managing and/or authenticating data access requests associated with data partitions for a server system.

An application framework (e.g., a cloud application framework) is typically characterized by a large number of the application components (e.g., services, microservices, and the like) that are offered by the application framework. Those application components typically include a large number of frontend application components and/or a large number of backend application components. One example application framework might include an enterprise instance of Jira®, an action tracking and project management software platform, developed by Atlassian Pty. Ltd. that may be licensed to Beta Corporation. Other software platforms may serve as application frameworks (e.g., Confluence®, Trello®, Bamboo®, Clover®, Crucible®, etc. by Atlassian Pty. Ltd) as will be apparent to one of ordinary skill in the art in view of the foregoing discussion.

Due to the scale and the numerosity of the application components, a large number of data objects may be generated by the application framework during a time interval. These created data objects may be generated for a variety of purposes and may be difficult to manage due to the sheer volume data objects and due to the complexity of the application framework. For example, the application framework may be configured as a collaborative application framework and data objects may be generated as a result of events, incidents, changes, component requests, alerts, notifications, workflows, service requests, service tickets, and/or other dynamic data related to the collaborative application framework. The data objects generated by an application framework may also relate to a business or enterprise that has deployed or licensed the application framework for managing events, incidents, changes, component requests, alerts, notifications, workflows, service requests, service tickets, and/or other dynamic data. Additionally, to further add to the complexity of the application framework, data objects may be transmitted via multiple types of communication channels such as, for example, email, application portals, widgets, chat channels, application programming interface (API) calls, etc.

To manage the scale, numerosity, and/or complexity of the data objects, an application framework may be configured as a cloud network infrastructure integrated with a multi-tenant architecture. The multi-tenant architecture may be configured to provide an application component (e.g., a single application component) that serves multiple tenants such as, for example, multiple customers, organizations, and/or client devices. For example, a tenant may refer to a user, a customer, an organization, a client device, a client system, or another type of tenant that utilizes and/or occupies resources associated with one or more portions of the multi-tenant architecture. An application component (e.g., a single application component) associated with a multi-tenant architecture may also utilize one or more databases, computing devices, virtual machines, server resources, machine learning models, and/or one or more other portions of an application framework. As such, a tenant may refer to a user, a customer, an organization, a client device, a client system, or another type of tenant that utilizes and/or occupies resources associated with one or more databases, computing devices, virtual machines, server resources, machine learning models, and/or one or more other portions of an application framework.

Additionally, an application framework associated with a multi-tenant architecture may store one or more portions of data objects and/or related data for an application component in a partition of a monolithic database designated for the application component. For example, an application framework typically utilizes a cell-based architecture for databases where data cells are typically inefficiently partitioned and are often comprised of data related to multiple components. In some examples, one or more partitions of a monolithic database may be interconnected via a partition set and one or more partition sets may be associated with one or more application components. For example, an application component may have a partition of a partition set allocated to the application component such that data objects with relation to the application component may be stored in the partition. In some examples, data objects related to the application component may be identified based on an identifier for the application component. A partition may be a logical boundary that defines which data hosted by an application component is to be stored therein. For example, each application component may utilize a particular partition that is accessible based on an API request to receive data and/or an authentication protocol for the application component. In addition, a partition may store data objects associated with multiple tenants where the data objects for respective tenants may be isolated and/or inaccessible to other tenants.

In such multi-tenant architectures, challenges arise in maintaining the compartmentalization and security of data for a tenant. Without proper data access authentication, an application framework associated with a multi-tenant architecture may face several risks such as, for example, data exfiltration. For example, an API request to receive data associated with a tenant is typically based solely on a partition identifier for a partition, and may lack secure authentication for access. Such insecure authentication may result in the risk of the exposure of data for a tenant to another entity (e.g., another tenant) for a related database and/or the application framework. Another possible risk is a confused deputy attack associated with a database system of an application framework. With a confused deputy attack, an application component may be undesirably instructed (e.g., by another entity or application component) to execute an incorrect and/or illegitimate operation with respect to a database and/or a data partition, which in some instances may result in the exposure of data for a tenant to another tenant or entity. Such attacks may lead to data corruption of the database and/or data partition. Such security vulnerabilities may additionally result in additional security vulnerabilities, storage inefficiencies, increased power consumption, a decrease in computing performance, and/or other technical drawbacks for one or more other databases, computing devices, virtual machines, server resources, machine learning models, and/or one or more other portions of the application framework.

To address the above-described challenges related to managing server systems and/or databases related to server systems, various embodiments of the present disclosure are directed to systems, apparatuses, methods, and/or computer program products for providing data access authentication for a data partition based on encrypted context associated with a data access request for the data partition. In various embodiments, an authentication layer may be integrated with respect to a database and/or a data partition such that an API request for receiving tenant data (e.g., a requesting client service) is provided with an encrypted context in order to obtain the tenant data from a multi-tenant data partition of a database. In various embodiments, the encrypted context may include metadata for a tenant. In some embodiments, the encrypted context may include a tenant identifier for tenant data stored in a data partition (e.g., a multi-tenant data partition) of a database. In some embodiments, the encrypted context may additionally or alternatively include a data sharding context for the API request. In various embodiments, the encrypted context may be utilized as authentication criteria for the API request.

Accordingly, with the data access authentication for a data partition as disclosed herein, tamperproof routing of data associated with a data partition may be provided. In various embodiments, improved data sharding functionality for application components of an application framework may thereby be provided. Data access authentication for a data partition as disclosed herein mitigates data exfiltration risks and improves data loss prevention, identity and access management, and data compartmentalization for an application framework associated with a multi-tenant architecture. Additionally or alternatively, security vulnerabilities for an application framework and/or a database system of an application framework may be mitigated. For example, unauthorized access to data (e.g., particular tenant data) stored in a data partition may be mitigated. In another example, a confused deputy attack associated with a database system of an application framework may be mitigated. Therefore, quality and/or accuracy of data for a database system and/or data partition may be further improved. By utilizing the data access authentication for a data partition as disclosed herein, computing resources and/or memory allocation with respect to processing and storage of data for the application framework may additionally or alternatively be improved. In doing so, various embodiments of the present disclosure make substantial technical contributions to improving the efficiency and/or the effectiveness of an application framework. Various embodiments of the present disclosure additionally or alternatively provide improved resiliency, management, and efficiency of database management, improved cross-product collaboration, improved scalability, improved service stability, improved usability, improved data quality, improved interactions, with respect to data related to an application framework.

Definitions

As used herein, the terms "data," "content," "digital content," "information," and similar terms may be used interchangeably to refer to data capable of being transmitted, received, and/or stored in accordance with embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The terms "computer-readable storage medium" refers to a non-transitory, physical or tangible storage medium (e.g., volatile or non-volatile memory), which may be differentiated from a "computer-readable transmission medium," which refers to an electromagnetic signal. Such a medium may take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical, infrared waves, or the like. Signals include man-made, or naturally occurring, transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer may read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

The terms "client device," "computing device," "network device," "computer," "user equipment," and similar terms may be used interchangeably to refer to a computer comprising at least one processor and at least one memory. In some embodiments, the client device may further comprise one or more of: a display device for rendering one or more of a graphical user interface (GUI), a vibration motor for a haptic output, a speaker for an audible output, a mouse, a keyboard or touch screen, a global position system (GPS) transmitter and receiver, a radio transmitter and receiver, a microphone, a camera, a biometric scanner (e.g., a fingerprint scanner, an eye scanner, a facial scanner, etc.), or the like. Additionally, the term "client device" may refer to computer hardware and/or software that is configured to access a component made available by a server. The server is often, but not always, on another computer system, in which case the client accesses the component by way of a network. Embodiments of client devices may include, without limitation, smartphones, tablet computers, laptop computers, personal computers, desktop computers, enterprise computers, and/or the like. Further non-limiting examples include wearable wireless devices such as those integrated within watches or smartwatches, eyewear, helmets, hats, clothing, earpieces with wireless connectivity, jewelry and so on, universal serial bus (USB) sticks with wireless capabilities, modem data cards, machine type devices or any combinations of these or the like.

The term "circuitry" may refer to: hardware-only circuit implementations (e.g., implementations in analog circuitry and/or digital circuitry); combinations of circuits and one or more computer program products that comprise software and/or firmware instructions stored on one or more computer readable memory devices that work together to cause an apparatus to perform one or more functions described herein; or integrated circuits, for example, a processor, a plurality of processors, a portion of a single processor, a multicore processor, that requires software or firmware for operation even if the software or firmware is not physically present. This definition of "circuitry" applies to all uses of this term herein, including in any claims. Additionally, the term "circuitry" may refer to purpose-built circuits fixed to one or more circuit boards, for example, a baseband integrated circuit, a cellular network device or other connectivity device (e.g., Wi-Fi card, Bluetooth circuit, etc.), a sound card, a video card, a motherboard, and/or other computing device.

The term "component" or "application component" refers to a computer functionality or a set of computer functionalities, such as the retrieval of specified information or the execution of a set of operations, with a purpose that different clients may reuse for their respective purposes, together with the policies that should control its usage, for example, based on the identity of the client (e.g., an application, another component, etc.) requesting the component. Additionally, a component may support, or be supported by, at least one other component via a component dependency relationship. For example, a translation application stored on a smartphone may call a translation dictionary component at a server in order to translate a particular word or phrase between two languages. In such an example the translation application is dependent on the translation dictionary component to perform the translation task.

In some embodiments, a component is offered by one computing device over a network to one or more other computing devices. Additionally, the component may be stored, offered, and utilized by a single computing device to local applications stored thereon and in such embodiments a network would not be required. In some embodiments, components may be accessed by other components via a plurality of APIs, for example, JavaScript Object Notation (JSON), Extensible Markup Language (XML), Simple Object Access Protocol (SOAP), Hypertext Markup Language (HTML), the like, or combinations thereof. In some embodiments, components may be configured to capture or utilize database information and asynchronous communications via message queues (e.g., Event Bus). Non-limiting examples of components include an open source API definition format, an internal developer tool, web based HTTP components, databased components, and asynchronous message queues which facilitate component-to-component communications.

In some embodiments, a component may represent an operation with a specified outcome and may further be a self-contained computer program. In some embodiments, a component from the perspective of the client (e.g., another component, application, etc.) may be a black box (e.g., meaning that the client need not be aware of the component's inner workings). In some embodiments, a component may be associated with a type of feature, an executable code, two or more interconnected components, and/or another type of component associated with an application framework.

In some embodiments, a component may correspond to a service (e.g., a web service). Additionally or alternatively, in some embodiments, a component may correspond to a library (e.g., a library of components, a library of services, etc.). Additionally or alternatively, in some embodiments, a component may correspond to one or more modules. Additionally or alternatively, in some embodiments, a component may correspond to one or more machine learning models. For example, in some embodiments, a component may correspond to a service associated with a type of service, a service associated with a type of library, a service associated with a type of feature, a service associated with an executable code, two or more interconnected services, and/or another type of service associated with an application framework. The term "component object identifier" refers to one or more data items or elements by which a component object may be uniquely identified. The component object identifier may include, for example, one or more of Internet Protocol (IP) addresses associated with a component, Uniform Resource Locators (URLs) associated with a component, numerical characters, alphabetical characters, alphanumeric codes, American Standard Code for Information Interchange (ASCII) characters, encryption keys, identification certificates, the like, or combinations thereof. An example embodiment of a component object identifier may comprise data provided by at least a component author, for example, a URL and a payload associated with a component. In some embodiments, the payload comprises a JSON formatted text that is either posted, by way of an HTTP POST, to a component when a resource is created or returned from a component, through an HTTP GET, when at least a resource is requested from the component.

The term "application framework" refers to a computing environment associated with one or more computing devices and one or more components (e.g., one or more application components), where the environment enables interactions with respect to components supporting at least one application. For example, an application framework may be a system (e.g., a server system, a cloud-based system, an enterprise system, etc.) where multiple components, multiple resources associated with components, multiple layers of components, and/or multiple layers of resources interact with one another in several complex manners. In some embodiments, the components are associated directly or indirectly with an application supported by the components. In some embodiments, the components may support the application over one or more communication networks. The application framework may include one or more components to generate and update a repository of collected information for each component (e.g., an event object repository). Accordingly, the application framework may provide for the collection of information, in the form of event objects, to facilitate monitoring of event streams associated with one or more components of the application framework. In certain embodiments, the application framework may be configured as a collaborative application framework that manages one or more collaborative applications such as, for example, one or more collaborative document applications, collaborative software development applications, and/or one or more other types of collaborative applications. In certain embodiments, the application framework may be configured as an enterprise instance of a collaboration and knowledge base component platform for managing documents and/or encouraging collaboration among users. In certain embodiments, the application framework may be configured as a service management software platform. In certain embodiments, the application framework may alternatively be configured to manage one or more project management applications, one or more work management applications, one or more software development applications, one or more product development applications, one or more portfolio management applications, or one or more other types of applications. In certain embodiments, the application framework may be configured as an enterprise instance of an information technology service management software platform. However, it is to be appreciated that, in other embodiments, the application framework may be configured as another type of component platform.

The term "application framework system" refers to a system that includes both a server framework and a repository framework to support the server framework. For example, an application framework refers to a system that includes a computing environment associated with one or more computing devices and one or more components, as well as a repository of collected information for each component and/or each computing device.

The term "application," "app," or similar terms refer to a computer program or group of computer programs designed for use by and interaction with one or more networked or remote computing devices. In some embodiments, an application refers to a mobile application, a desktop application, a command line interface (CLI) tool, or another type of application. Examples of an application comprise workflow engines, component desk incident management, team collaboration suites, cloud components, word processors, spreadsheets, accounting applications, web browsers, email clients, media players, file viewers, videogames, and photo/video editors. An application may be supported by one or more components either via direct communication with the component or indirectly by relying on a component that is in turn supported by one or more other components.

The term "service" refers to a type of component. In some embodiments, a service provides a visual representation of one or more data structures. In some embodiments, a service is configured for viewing data, searching for data, creating data, updating data, managing relationships among data, assigning attributes related to data, and/or storing data associated with one or more data structures. In some embodiments, a service is configured as a system, tool or product to facilitate viewing data, searching for data, creating data, updating data, managing relationships among data, assigning attributes related to data, and/or storing data associated with one or more data structures. In some embodiments, a service comprises a set of metadata attributes associated with a technical capability, a technical configuration, an application capability, an application configuration, and/or another metadata attribute. In some embodiments, a service is published to one or more client devices via one or more APIs. In some embodiments, a service is a logical representation of an application stack. In some embodiments, a service corresponds to one or more microservices.

The term "microservices" refers to a set of services that are interconnected and independently configured to provide a monolith service. In some embodiments, a microservice is configured with one or more APIs integrated with one or more other microservices and/or one or more other applications. In some embodiments, a microservice is a single-function module with a defined set of interfaces and/or a defined set of operations configured to integrate with one or more other microservices and/or one or more other applications to provide a monolith service.

The term "dependency relationship" or similar terms refer to an exchange of data and/or functionality between a first component and a second component. For example, the first component may be directly dependent upon the second component for a DNS lookup. In some embodiments, the second component may be directly dependent upon a third component whereby the first component is transitively dependent upon the third component via the second component. As such, the dependency relationship may be a direct relationship comprising two components or it may be a transitive relationship comprising a plurality of components. In some embodiments, a first component and a second component may have a plurality of dependency relationships between them. For example, the second component may perform both a lookup and access log function for the first component.

The terms "internal component," "internal resource," or similar terms refer to a program, application, platform, or component that is configured by a developer to provide functionality to another one or more of their programs, applications, platforms, or components, either directly or indirectly through one or more other components, as opposed to using an external component. Internal components operate on a compiled code base or repository that is at least partially shared by an application which utilizes the functionality provided by the internal component. In some embodiments, the application code base and the internal component code base are hosted on the same computing device or across an intranet of computing devices. An application communicates with internal components within a shared architectural programming layer without external network or firewall separation. In some embodiments, an internal component is used only within the application layer which utilizes the internal components functionality. Information related to internal components may be collected and compiled into component objects which may also be referred to as internal component objects. An example embodiment of an internal component is a load balancer configured for routing and mapping API and/or component locations. Internal components may be configured for information-based shard routing, or in other words, routing and mapping API and/or component locations based on predefined custom component requirements associated with an application. For example, an internal component may be configured to identify where communication traffic originates from and then reply to the communications utilizing another component for reply communication.

The terms "external component," "external resource," "remote resource," or similar terms refer to a program, application, platform, or component that is configured to communicate with another program, application, platform, or component via a network architecture. In some embodiments, communications between an external component and an application calling the external component takes place through a firewall and/or other network security features. The external component operates on a compiled code base or repository that is separate and distinct from that which supports the application calling the external component. The external components of some embodiments generate data or otherwise provide usable functionality to an application calling the external component. In other embodiments, the application calling the external component passes data to the external component. In some embodiments, the external component may communicate with an application calling the external component, and vice versa, through one or more APIs. For example, the application calling the external component may subscribe to an API of the external component that is configured to transmit data. In some embodiments, the external component receives tokens or other authentication credentials that are used to facilitate secure communication between the external component and an application calling the external component in view of the applications network security features or protocols (e.g., network firewall protocols). An example embodiment of an external component may include cloud components (e.g., AWS®).

The term "repository" refers to a database, a datastore, and/or a memory device which is accessible by one or more computing devices for retrieval and storage of one or more data components, the like, or combinations thereof. The repository may be configured to organize data components stored therein in accordance with one or more particular data classification labels or other attributes attributed to the data component (e.g., a scoring metric, file size, file type, etc.). For example, a repository may be structured in accordance with one or more data components associated with one or more services, applications, data classification labels, internal resources, external resources, network functions, APIs, the like, or combinations thereof. In some embodiments, a repository may be at least partially stored on one or more of a server, remotely accessible by a computing device, or on a memory device on-board the computing device.

The term "partition" refers to a collection of data that is stored in a database, datastore, or the like, of an application framework system. It is to be appreciated that the term "partition" may be interchangeably referred to herein as a "data partition." In some embodiments, a partition is a logical boundary that defines a collection of data. In some embodiments, a partition may be used to store data or a subset of data. For example, a partition may store one or more data objects associated with a component. By way of example, a component storing data may split a large table of data into smaller tables of data, each smaller table containing some subset of the overall data referred to as a partition. For example, a component may store data associated with one tenant in one partition and store data associated with another tenant in another partition. In another example, a tenant may store frequently accessed information in one partition and store infrequently accessed information in another partition. In yet another example, a component may store information from one region in one partition and store information from another region in another partition.

In some embodiments, a partition may be associated with a partition identifier, component, tenant, workspace, encrypted context, component archetype, or the like. In some embodiments, a workspace may be a combination of a particular tenant and a particular component that are associated. For example, a tenant of a component may own and manage data stored in a partition. In such an embodiment, the partition may be associated with the component, a tenant identifier of the tenant, and a partition identifier of the partition. In some embodiments, a partition may be associated with a secret key, encrypted partition key, encrypted context, validation partition key, and/or the like. In some embodiments, a partition may require that any requests (e.g., CRUD requests) provide a secret key and a partition identifier associated with the partition in order to be processed at the partition. In some embodiments, processing a data access request for a partition may include retrieving an encrypted partition key and a partition identifier associated with the partition. In some embodiments, retrieving a partition identifier for a partition may be based at least in part on an encrypted context and or component archetype data structure. In some embodiments, a partition may be created, merged, migrated, duplicated, deleted, and/or the like. In some embodiments, creation and management of a partition is handled by a resource provisioning system, component, control-plane API, admin endpoints, and/or the like.

The term "partition identifier" refers to a data entity associated with a partition that uniquely identifies the partition. A partition identifier may include a defined format. In some embodiments, a partition identifier may be used in an API call or other network communication to a component of an application framework to read or write some data stored within the respective partition. For example, the partition identifier may be referenced in association with a request, in an HTTP header of a request, in an attribute of a message, or the like.

The term "partition generation request" refers to a data entity or signal that initiates the generation of a new partition. For example, an entity (e.g., a component, tenant, or the like) may provide a partition generation request and, in response, a new partition may be generated. In some embodiments, a partition generation request may be processed by a resource provisioning system or the like. In some embodiments, a partition generation request may include or otherwise be associated with a secret key to be associated with the partition generated. In some embodiments, creating a partition in response to a partition generation request includes generating a partition, a partition identifier, a secret key, an encrypted partition key, a validation partition key, and/or the like. For example, if a partition generation request is not associated with a secret key, a secret key may be generated.

The term, "encrypted partition key" may refer to an encrypted secret key. For example, an encrypted partition key may be generated by encrypting a secret key based on an encrypted context. In some embodiments, an encrypted partition key may be generated and/or stored by a resource provisioning system, tenant, component, or the like. For example, a tenant of a component may request (e.g., via a partition generation request) a new partition and generate and store an encrypted partition key associated with the partition by encrypting a secret key using their encrypted context (e.g., request context, tenant identifier, or the like). In some embodiments, an encrypted partition key may be generated in response to a partition generation request. For example, when a partition is generated by a resource provisioning system, the resource provisioning system may generate an encrypted partition key associated with the partition by encrypting a secret key using an encrypted context. In some embodiments, an encrypted partition key may be retrieved for a data access request. For example, processing a data access request may include identifying an encrypted partition key (e.g., from a context service). In some embodiments, an encrypted partition key may be decrypted. For example, an encrypted partition key may be decrypted using an encrypted context. In some embodiments, an encrypted partition key may be provided to various entities for processing data access requests, partition generation requests, to persist data, and/or the like. For example, an encrypted partition key may be provided to a resource provisioning system, a context service, a component, a tenant, and/or the like.

The term "validation partition key" refers to a data entity used to validate data access requests to partitions based on at least a secret key. In some embodiments, a validation partition key is based on a secret key salted with one or more other data entities (e.g., a partition identifier). For example, a validation partition key may be a hash mapping between a secret key and a partition identifier of a partition. In some examples, a validation partition key may be generated by hashing a partition identifier appended to a secret key associated with a partition. In some embodiments, a validation partition key may be compared with a candidate validation partition key. In some examples, if a candidate validation partition key is determined to match a validation partition key, then an associated data access request may be processed at the partition. In some examples, if a candidate validation partition key is determined to not match a validation partition key, then an associated data access request may be discarded. In some embodiments, the resource provisioning system may store and use a validation partition key to validate data access requests. In some embodiments, the resource provisioning system may generate a validation partition key. For example, the resource provisioning system may receive an encrypted partition key during a partition generation request, use an encrypted context (e.g., a tenant identifier) to decrypt the encrypted partition key resulting in a secret key, and generate the validation partition key by hashing the secret key and an associated partition identifier. The resource provisioning system may then use the validation partition key to validate future data access requests for the partition.

The term "secret key" refers to a data entity used to secure access to a partition. For example, a partition may be configured such that it may not be accessed unless a request includes the correct secret key. In some embodiments, a secret key may be provided when an entity (e.g., a tenant, component, or the like) makes a partition generation request. In other embodiments, a secret key may be generated in response to a partition generation request. For example, a secret key may be generated by a resource provisioning system, a storage service, and/or the like, for example, during resource provisioning for an associated partition. In some embodiments, a secret key may be stored as an encrypted partition key. For example, a tenant may generate and store an encrypted partition key that is generated by encrypting a secret key using an encrypted context (e.g., their request context, tenant identifier, or the like). In some embodiments, if a partition is configured to require a secret key for access, any data access requests (e.g., CRUD requests) for the partition may be verified to supply a secret key. For example, a read request for a partition configured to require a secret key may be verified to contain a hash of the secret key (e.g., a candidate validation partition key) in the read request's incoming HTTP headers, where the hash of the secret key matches a stored validation partition key.

The term "decrypted partition key" refers to an encrypted partition key that has been decrypted. In some embodiments, a decrypted partition key may be generated by decrypting an encrypted partition key using the same encrypted context that was used to generate the encrypted partition key from a secret key. In such an embodiment, the decrypted partition key and the secret key used to generate the encrypted partition key will be identical data entities. In some embodiments, if decryption of an encrypted partition key is attempted using a different encrypted context than the one used to generate the encrypted partition key from a secret key, the decryption may fail. In some embodiments, a decrypted partition key may be used to generate a candidate validation partition key. In one example, if a decrypted partition key and a secret key associated with a partition are identical data entities, then the candidate validation partition key generated based on the decrypted partition key may match the validation partition key associated with the partition. In another example, if a decrypted partition key and a secret key associated with a partition are not identical data entities, then the candidate validation partition key generated based on the decrypted partition key may not match the validation partition key associated with the partition.

In some embodiments, the decrypted partition key is generated on demand. For example, in response to each data access request to a partition that requires a secret key for access, an encrypted partition key may be retrieved and decrypted using an encrypted context, thereby generating a decrypted partition key. In some embodiments, a decrypted partition key may be cached in memory for the associated encrypted context of the data access request. In such an embodiment, a second data access request made using the same encrypted context may not need to perform decryption again, as the decrypted partition key may be retrieved from the cached memory. In some embodiments, an encrypted partition key will not successfully be decrypted using any encrypted context other than the one that was used to generate that encrypted partition key. In this manner, a data access request made from a first encrypted context will not succeed in accessing a partition that was generated in association with a second encrypted context. In some embodiments, the encrypted partition key used to generate the decrypted partition key is retrieved and decrypted when the proxy service queries the context service. For example, when the proxy service queries the context service, an auto decryptor may be engaged to decrypt the encrypted partition key and cache the decrypted partition key.

The term "resource provisioning system" refers to a system configured to manage resources, partitions, partitioning operations, and/or the like, associated with an application framework. In some embodiments, the resource provisioning system may generate a partition, partition identifier, validation partition key, and/or the like. For example, in response to a partition generation request, the resource provisioning system may generate a partition and an associated partition identifier. Additionally, in some embodiments, the resource provisioning system may generate and store a validation partition key. In some embodiments, the resource provisioning system manages a set of APIs to provide cloud provisioning related to components of an application framework via data partitioning management and/or routing. In some embodiments, the resource provisioning system is responsible for the lifecycle management of one or more partitions, such as creating, merging, migrating, duplicating, deleting, and/or the like. In some embodiments, the resource provisioning system may be configured to generate, receive, or transmit a partition, partition identifier, tenant identifier, secret key, encrypted partition key, encrypted context, or the like. In some embodiments, the resource provisioning system may receive a partition generation request and receive (or generate) a secret key in association. In some embodiments, the resource provisioning system may generate and/or delete partitions. In some embodiments, the resource provisioning system may generate an encrypted partition key by encrypting a secret key using an encrypted context associated with a partition generation request. In some embodiments, the resource provisioning system may persist data associated with a partition generation request such as the encrypted partition key and/or partition identifier via the context service. In some embodiments, such as an existing partition that is reconfigured to require a secret key, the resource provisioning system may perform operations associated with backfilling secret keys, encrypted partition keys, and/or the like for such existing partitions. In some embodiments, the resource provisioning system may be associated with the routing system.

In some embodiments, the resource provisioning system may process a data access request. For example, the resource provisioning system may process one or more CRUD requests at a partition. In some embodiments, when a partition associated with a data access request requires a secret key for access, the resource provisioning system may perform a validation operation for the partition based on the data access request. For example, the resource provisioning system may receive a candidate validation partition key associated with the data access request. In response, the resource provisioning system may compare the validation partition key to the candidate validation partition key. In some examples, if the validation partition key and the candidate validation partition key match, the resource provisioning system may process the data access request at the partition. In other examples, if the validation partition key and the candidate validation partition key do not match, the resource provisioning system may discard the data access request.

In some embodiments, the resource provisioning system may receive an encrypted partition key and an associated encrypted context during a partition generation request. The resource provisioning system may decrypt the encrypted partition key using the encrypted context (e.g., an encrypted context containing the tenant identifier) resulting in a secret key. The resource provisioning system may store a hash of the secret key salted with the partition identifier for later use in validating data access requests. In some embodiments, the resource provisioning system may validate both the partition identifier and the secret key provided with a data access request. In some embodiments, if either the partition identifier or the secret key is missing or mismatched when validating, the resource provisioning system may treat the associated data access request as a partition level authorization failure and deny or discard the data access request.

The term, "encrypted context" refers to supplementary data associated with a data access request, partition generation request, partition, tenant, component, CRUD request, API call, network communication, message, request, and/or the like. For example, an encrypted context may include information related to the source or target of a request, resources related to the request, headers and/or attributes associated with the request, identifiers associated with the request, and/or the like. In some embodiments, encrypted context may be or include a HTTP header, URL, and/or the like. In some embodiments, calls, messages, requests, and/or the like may be required to include an encrypted context that includes or maps to information such as identifiers. In some embodiments, an encrypted context may refer to a metadata mapping and/or the like, between entities. In some embodiments, an encrypted context may be a tenant identifier, request context, sharding context, or the like. For example, in one system (e.g., resource provisioning system) the encrypted context may be a tenant identifier, and in a second system (e.g., routing system) the encrypted context may be a sharding context such that the tenant identifier of the first system is analogous with the sharding context of the second system. By way of example, an encrypted context may be a request context of a tenant (e.g., tenant identifier) that is analogous to the routing system's sharding context. For example, an encrypted context may be information that can be directly and consistently associated with a request context. In some embodiments, an encrypted context may be an immutable identifier associated with a tenant and/or may be available for a request context (e.g., a tenant identifier). In some embodiments, the encrypted context may include and/or be based on metadata associated with a tenant or other entity. For example, the metadata may be associated with one or more databases and/or partitions associated with a tenant, one or more application components associated with a tenant, one or more licenses associated with a tenant, one or more features accessible by a tenant, application framework configuration information associated with a tenant, and/or other information associated with a tenant. In some examples, a particular encrypted context may be associated with a particular entity such that any request from that particular entity is inherently made using that particular encrypted context and cannot be made using any other encrypted context. In some embodiments, an encrypted context of a request may be used in a routing system to determine routing for a request. By way of example, a data access request from a tenant may route to a resource provisioning system based in part on an encrypted context. For example, the encrypted context may be a sharding context of the resource provisioning system that aligns to a request context of any data access requests made by the tenant. In some embodiments, an encrypted context may be used to perform encryption or decryption. For example, an encrypted context may be used to encrypt a secret key or decrypt an encrypted key. In this manner, a secret key encrypted in a particular encrypted context can only be properly decrypted using that same particular encrypted context.

The term "tenant" may refer to an entity associated with a tenant identifier that uses one or more components of an application framework. For example, a tenant may be a customer, client, business, or the like, that uses a service of an application framework. In some embodiments, a component may be associated with a plurality of tenants. In some embodiments, a database of an application framework may contain data associated with any tenants that use a component of the application framework. It may be important that each tenant's data is isolated and inaccessible to other tenants, for example, in cases where the data of multiple tenants are stored in partitions associated with a common component, shard, database, and/or the like.

In some embodiments, a tenant may provide a request to the routing system which transmits the request to the resource provisioning system to access a partition. In other embodiments, a tenant may choose to provide requests directly to the resource provisioning system. In some embodiments, a tenant may make a partition generation request to generate a new partition to store their data. In some embodiments, a tenant may provide or receive a secret key which is required for accessing their partition. For example, a tenant may provide a secret key alongside a partition generation request and store an encrypted partition key generated by encrypting the secret key using an encrypted context (e.g., their request context or tenant identifier). In some embodiments, a tenant may retrieve their own records of the partition identifier associated with their partition and encrypted partition key when making a request. For example, a tenant may look up its own record of a partition identifier and encrypted partition key associated with a partition of a data access request. In such an embodiment, the tenant may attempt to decrypt the encrypted partition key using an encrypted context (e.g., the current request context), and if successful, the tenant may send the secret key and the partition identifier (e.g., candidate validation partition key) as HTTP headers to the resource provisioning system. In some embodiments, any communication to or from a tenant may be performed via a client device associated with the tenant.

The term "tenant identifier" refers to a data entity associated with a tenant that uniquely identifies the tenant. A tenant identifier may include a defined format. In some embodiments, a tenant identifier may be used in an API call or other network communication to a component, partition, or the like, of an application framework to read or write some data. Each tenant associated with an application framework may have a respective unique tenant identifier. In some embodiments, a tenant identifier may be or included in an encrypted context for any requests made by the respective tenant. In some embodiments, a tenant identifier may be generated and/or managed by a resource provisioning system. For example, the resource provisioning system may generate and/or use a tenant identifier to represent the logical owning entity for a resource (e.g., a partition). In some embodiments, a tenant identifier may be a workspace for a resource provisioning system resource. For example, a tenant identifier may be a Jira workspace for a partition. In some embodiments, the tenant identifier provided by the resource provisioning system may align with a sharding context. For example, both the tenant identifier and the sharding context may be analogous entities and be used as encrypted contexts in processing a data access request.

The term, "context service" refers to a system configured to transform, transmit, organize, store, persist, and/or the like, data associated with the application framework. In some embodiments, the context service may support data persistence for data associated with partitions, tenant, components, and/or the like. For example, the context service may provide persistence of encrypted partition keys, partition identifiers, tenant identifiers, and/or the like. In some embodiments, the context service provides a read-optimized view of associated data. In some embodiments, the context service is accessed in order to process a request. For example, to process a data access request associated with a particular partition, the context service may be accessed to provide a transformed view of data associated with the particular partition (e.g., partition identifier, encrypted partition key). In some embodiments, the context service enables the data to be accessible by API requests. For example, as new data is updated, the context service may reflect a view of the new data that can be retrieved via a REST API. In some embodiments, the context service may be included in the routing system. In some embodiments, the context service may be associated with storing and/or retrieving information stored within partitions. For example, the context service may be associated with storing and/or retrieving encrypted partition keys and/or partition identifiers. In some embodiments, the context service may be extended to capture the encrypted partition key and partition identifier or provide persistence of encrypted partition keys, partition identifiers, and/or the like. In some embodiments, the context service contains data used to process requests. For example, the context service may include metadata used to process requests (e.g., data access requests) by, for example, providing resource locations (e.g., partitions, partition identifiers).

The term "proxy service" refers to a data traffic managing system for the application framework. In some embodiments, the proxy service may act as an intermediary between a client device and various other components, systems, and services (e.g., the resource provisioning system, context service). In some embodiments, the proxy service may be associated with a context service. In some embodiments, the context service may be associated with the proxy service. For example, incoming and outgoing data may be received/transmitted by the proxy service which may leverage the context service to resolve routing. For example, incoming requests (e.g., data access requests) may be received by the proxy service which may use the context service in processing the requests. In another example, responses to a request may be transmitted to a tenant (e.g., via a client device) by the proxy service which may use the context service in processing the request and/or response. In some embodiments, an auto decryptor for transformer service keys may be deployed within the context service. For example, the context service may be queried during a data access request where an auto decryptor may attempt decryption. For example, the auto decryptor may attempt decryption for encrypted partition keys retrieved from querying the context service, and if the decryption is successful, the result may be cached (e.g., in association with an encrypted context associated with the data access request). In some embodiments, the proxy service may be associated with in the routing system. In some embodiments, the application framework may be implemented without a proxy service. For example, in some embodiments, the functions of the proxy service as described herein may be performed by a client device (e.g., as a library and/or the like). In some embodiments, a data access request from a client device may be routed directly to a database, partition, and/or the like (e.g., for an embodiment where a proxy service is not included in an application framework).

The term "create read update delete" or "CRUD" refers to the operations of creating, reading, updating, or deleting data. In some embodiments, CRUD requests (e.g., data access requests) are made to create, read, update, or delete data, partitions, and/or the like. In some embodiments, one or more entities, components, systems, and/or the like of an application framework may make and/or receive various CRUD requests to propagate data throughout the application framework. In some embodiments, a CRUD request for a partition may be verified to supply a secret key in its incoming headers. For example, if a partition is configured to require a secret key for access, then a data access request sent to the partition may be verified to contain the secret key before being processed at the partition.

The term "routing system" refers to an infrastructure configured to facilitate the transmission of data such as, for example, a data object via a communication channel, path or mapping used to propagate the data between tenants, applications, components, databases, partitions, and/or the like. In some embodiments, the routing system may include or otherwise be associated with the proxy service and/or context service. For example, routing a request may use information from the context service and may, in some embodiments, propagate though the proxy service and/or the like.

In some embodiments, the routing system may be based on one or more routing criteria related to an application framework system and/or a communication channel. Managing routing decisions may ensure consistency on how the appropriate components, partitions, and/or the like are used when making calls or requests within an application framework. For example, in a data access request, an encrypted context can be used in part by the routing system to transmit the data access request from the requesting entity to a partition. In some embodiments, the routing system handles incoming requests (e.g., data access requests) requesting a route to a component archetype data structure for a specific encrypted context (e.g., a Jira workspace) and uses such information to perform routing for the requests. In some embodiments, the routing system includes a sharding context that is analogous to other encrypted contexts such as, for example, a tenant identifier or a request context. In some embodiments, routing requests may include defined formats or parameters. For example, routed requests may include various HTTP headers (e.g., an encrypted partition key) that should be sent when making a routed request.

The term, "client communication service" refers to a component, service, or system configured to act as an intermediary for one or more components of an application framework and client devices. In some embodiments, a client communication service may function to provide transmission of data such as, for example, a data object via a communication channel, path, or mapping. In some embodiments, the client communication service may receive requests and perform or determine routing information for the requests. For example, the client communication service may determine where data associated with an incoming request is located within or using, for example, a context service. In some embodiments, the client communication service may forward requests to appropriate regions, components, partitions, or the like for processing. In some embodiments, a client communication service may data manipulation operations such as generating data and/or storing data. For example, the client communication service may be configured to perform encryption and decryption, access data stores, retrieve data, store data, query databases, and/or the like. In some embodiments, the client communication service may be configured to handle and process partition generation requests, data access requests, and/or the like. In some embodiments, the client communication service may be used similarly to or in place of the routing system. For example, the client communication service may be configured to perform one or more functions of the routing system, replace one or more components of the routing system, support or supplement the routing system, or the like.

The term "manage" with respect to a data object refers to one or more actions performable for altering a data object and/or information therein. Non-limiting examples of actions for managing a data object include deleting a data object, creating a data object, editing a portion of information embodied by and/or otherwise stored in a data object, altering the state of a data object, and/or altering access to a data object.

The term "maintain" with respect to a data object and/or an application refers to a state of read and/or write access to a memory or other storage for persistently and/or temporarily storing the data object by the application. In some such contexts, an application that maintains a data object is permissioned to directly alter information embodied by and/or stored in the data object.

The term "region" represents a physical location which may host resources and components. In some embodiments, a region is mapped to a particular region supported by, for example, AWS or another cloud computing or server system.

The term "data access request" refers to a signal received by one or more computing devices (e.g., servers, systems, platforms, etc.) to access data related to a component across one or more partitions and/or databases. In some embodiments, a data access request may be associated with one or more APIs (e.g., control-plane APIs, etc.), network components, a service proxy communicatively coupled between a client device and a server framework, database systems, and/or an application framework. In some embodiments, a data access request may be received by application framework system to access data related to a component across one or more partitions and/or databases. In some embodiments, functionality associated with receiving, processing, and/or generating a data access request functionality may be integrated within an application framework system.

The term "tamperproof routing" refers to particular data routing functionality associated with an application framework and/or an application framework system. In some embodiments, tamperproof routing provides improved data access request functionality and/or improved data routing associated with one or more partitions and/or databases. In some embodiments, tamperproof routing provides data access authentication for a partition based on encrypted context associated with a data access request for the partition.

The term "interaction signal" refers to a signal received by one or more computing devices (e.g., servers, systems, platforms, etc.) which are configured to cause an application framework system to perform one or more actions associated with one or more components of the application framework system. The interaction signal may be received via a component management interface, an API, a communication interface, the like, or combinations thereof. In one or more embodiments, the interaction signal may be generated by a client device via one or more computer program instructions. In various embodiments, an interaction signal may be generated via a collaborative application, event, event stream, or the like. Additionally or alternatively, the interaction signal may cause one or more actions, one or more changes, and/or one or more predictive inferences with respect to a collaborative application, event, event stream, or the like.

The term "interface element" refers to a rendering of a visualization and/or human interpretation of data associated with an application framework and/or a distributed ledger system. In one or more embodiments, an interface element may additionally or alternatively be formatted for transmission via one or more networks. In one or more embodiments, an interface element may include one or more graphical elements and/or one or more textual elements.

The term "visualization" refers to visual representation of data to facilitate human interpretation of the data. In some embodiments, visualization of data includes graphic representation and/or textual representation of data.

The term "graphical control element" refers to a computer input element that allows a user to enter input to facilitate one or more actions with respect to an application framework.

The term "interface area" refers to an area of an electronic interface, where the area may be situated in relation to one or more other interface areas of the electronic interface. An interface area may be comprised of groupings of pixels, or may be defined according to coordinates of a display device configured to render the interface. A size of an interface may be adjusted according to parameters associated with the display device. An interface area may include one or more interface elements. For example, an interface element may include a visualization. In certain embodiments, an interface area may include one or more graphical elements and/or or more textual elements. In certain embodiments, an interface area may be void of an interface element and/or a visualization. In certain embodiments, an interface area may include a graphical control element and/or one or more other interactive interface elements.

Thus, use of any such terms, as defined herein, should not be taken to limit the spirit and scope of embodiments of the present disclosure.

Example System Architecture

Methods, apparatuses, and computer program products of the present disclosure may be embodied by any of a variety of devices. For example, the method, apparatus, and computer program product of an example embodiment may be embodied by a networked device (e.g., an enterprise platform, etc.), such as a server or other network entity, configured to communicate with one or more devices, such as one or more query-initiating computing devices. Additionally or alternatively, the computing device may include fixed computing devices, such as a personal computer or a computer workstation. Still further, example embodiments may be embodied by any of a variety of mobile devices, such as a PDA, mobile telephone, smartphone, laptop computer, tablet computer, wearable, the like or any combination of the aforementioned devices.

FIG. 1 illustrates an example system architecture 100 within which embodiments of the present disclosure may operate. The system architecture 100 includes an application framework system 105 configured to interact with one or more client devices 102*a-n*, such as client device 102*a*, client device 102*b*, and/or client device 102*n*. In one or more embodiments, the one or more client devices 102*a-n* may be configured to interact with one or more components managed by an application framework 106 of the application framework system 105. For example, in one or more embodiments, the one or more client devices 102*a-n* may be configured to send data to the one or more components managed by the application framework 106 and/or receive data from the one or more components managed by the application framework 106. In one or more embodiments, the one or more components may interact with one another in several complex manners to provide collaborative applications and/or collaborative services.

In one or more embodiments, the application framework system 105 includes a database system 107 associated with one or more databases 109. The one or more databases 109 may store data associated with one or more components managed by the application framework 106. For example, the database system 107 may store data for one or more component objects and component object dependencies in one or more databases 109. The one or more databases 109 may be configured to support data sharding. For example, a database 109 of database system 107 may include one or more partition sets, such as multiple distributed partition sets that are connected through a computer network. Each partition set may include one or more partitions configured to store at least one of one or more data assets and/or one or more data about the computed properties of one or more data assets. Moreover, each partition set in the database system 107 may include one or more non-volatile storage or memory media including but not limited to hard disks, ROM, PROM, EPROM, EEPROM, flash memory, MMCs, SD memory cards, memory sticks, CBRAM, PRAM, FeRAM, NVRAM, MRAM, RRAM, SONOS, FJG RAM, Millipede memory, racetrack memory, the like, or combinations thereof.

In some embodiments, the database system 107 may include one or more databases 109 associated with one or more partition sets containing one or more partitions associated with one or more component objects and component object dependencies. In some embodiments, the data included in database system 107 is distributed to the one or more partitions. For example, the data of the one or more databases 109 may be stored into one or more partitions associated with one or more partition sets.

The system architecture 100 also includes a tamperproof routing apparatus 120. In an embodiment, the tamperproof routing apparatus 120 is implemented separate from the application framework system 105. Alternatively, in certain embodiments, the application framework system 105 may include the tamperproof routing apparatus 120. In various embodiments, the application framework system 105 and/or the tamperproof routing apparatus 120 may also be configured to interact with the one or more client devices 102*a-n*. In various embodiments, the tamperproof routing apparatus 120 may be configured to interact with application framework system 105. For example, in one or more embodiments, the tamperproof routing apparatus 120 may be configured to interact with and/or manage one or more components of the application framework 106 and/or one or more databases 109 of the database system 107. In some embodiments, the tamperproof routing apparatus 120 is configured to manage one or more partitions of the one or more databases 109. In some embodiments, the tamperproof routing apparatus 120 is configured to manage access to one or more partitions associated with the one or more databases 109. For example, in some embodiments, the tamperproof routing apparatus 120 is configured to manage authorization of one or more data access requests with respect to one or more partitions associated with the one or more databases 109. In some embodiments, the tamperproof routing apparatus 120 is configured for providing data access authentication for one or more partitions associated with the one or more databases 109 based on encrypted context associated with a data access request for the one or more partitions.

The application framework system 105, the tamperproof routing apparatus 120, and/or the one or more client devices 102*a-n* may be in communication using a network 104. Additionally or alternatively, in various embodiments, the application framework system 105 and the tamperproof routing apparatus 120 may be in communication via a backend network and/or an enterprise network separate from the one or more client devices 102*a-n*. The network 104 may include any wired or wireless communication network including, for example, a wired or wireless local area network (LAN), personal area network (PAN), metropolitan area network (MAN), wide area network (WAN), the like, or combinations thereof, as well as any hardware, software and/or firmware required to implement the network 104 (e.g., network routers, etc.). For example, the network 104 may include a cellular telephone, an 802.11, 802.16, 802.20, and/or WiMAX network. Further, the network 104 may include a public network, such as the Internet, a private network, such as an intranet, or combinations thereof, and may utilize a variety of networking protocols now available or later developed including, but not limited to Transmission Control Protocol/Internet Protocol (TCP/IP) based networking protocols. In some embodiments, the protocol is a custom protocol of JSON objects sent via a WebSocket channel. In some embodiments, the protocol is JSON over RPC, JSON over REST/HTTP, the like, or combinations thereof.

A client device from the one or more client devices 102*a-n* may include a mobile device, a smart phone, a tablet computer, a laptop computer, a wearable device, a personal computer, an enterprise computer, a virtual reality device, or another type of computing device. In one or more embodiments, a client device from the one or more client devices 102*a-n* includes geolocation circuitry configured to report a current geolocation of the client device. In some embodiments, the geolocation circuitry of the client device may be configured to communicate with a satellite-based radio-navigation system such as the global position satellite (GPS), similar global navigation satellite systems (GNSS), or combinations thereof, via one or more transmitters, receivers, the like, or combinations thereof. In some embodiments, the geolocation circuitry of the client device may be configured to infer an indoor geolocation and/or a sub-structure geolocation of the client device using signal acquisition and tracking and navigation data decoding, where the signal acquisition and tracking and the navigation data decoding is performed using GPS signals and/or GPS-like signals (e.g., cellular signals, etc.). Other examples of geolocation determination include Wi-Fi triangulation and ultra-wideband radio technology.

In one or more embodiments, the application framework system 105 may be configured to receive one or more interaction signals from one or more of the client devices 102*a-n*. An interaction signal refers to a signal configured to cause one or more actions with respect to the application framework 106. For example, an interaction signal may be a signal configured to cause one or more actions with respect to one or more computing devices and or one or more components managed by the application framework 106. An interaction signal may be generated by the one or more client devices 102*a-n* and may be received via a component management interface of the application framework 106, an API of the application framework 106, a communication interface of the application framework 106, the like, or combinations thereof. Based on the one or more interaction signals, the application framework system 105 may perform one or more actions with respect to the application framework 106. In various embodiments, the one or more actions may be associated with one or more user identifiers associated with one or more events with respect to one or more components of the application framework 106. For example, the one or more actions may initiate and/or correspond to one or more events with respect to one or more components of the application framework 106. In certain embodiments, the one or more actions may be associated with one or more events with respect to a one or more computing devices and or one or more components managed by the application framework 106. In certain embodiments, the one or more actions may be associated with one or more user identifiers with respect to one or more computing devices and or one or more components managed by the application framework 106.

In some embodiments, the tamperproof routing apparatus 120 may manage and/or configure one or more components of the application framework system 105 and/or one or more databases 109 of the database system 107. In one or more embodiments, the tamperproof routing apparatus 120 may allocate one or more partitions of a partition associated with a database 109 to a component of the application framework 106. In one or more embodiments, the tamperproof routing apparatus 120 may determine and/or perform routing associated with a database 109 and/or a component of the application framework 106. In one or more embodiments, the data sharding apparatus may manage a component and/or database 109 of the application framework 106.

Figure 2:
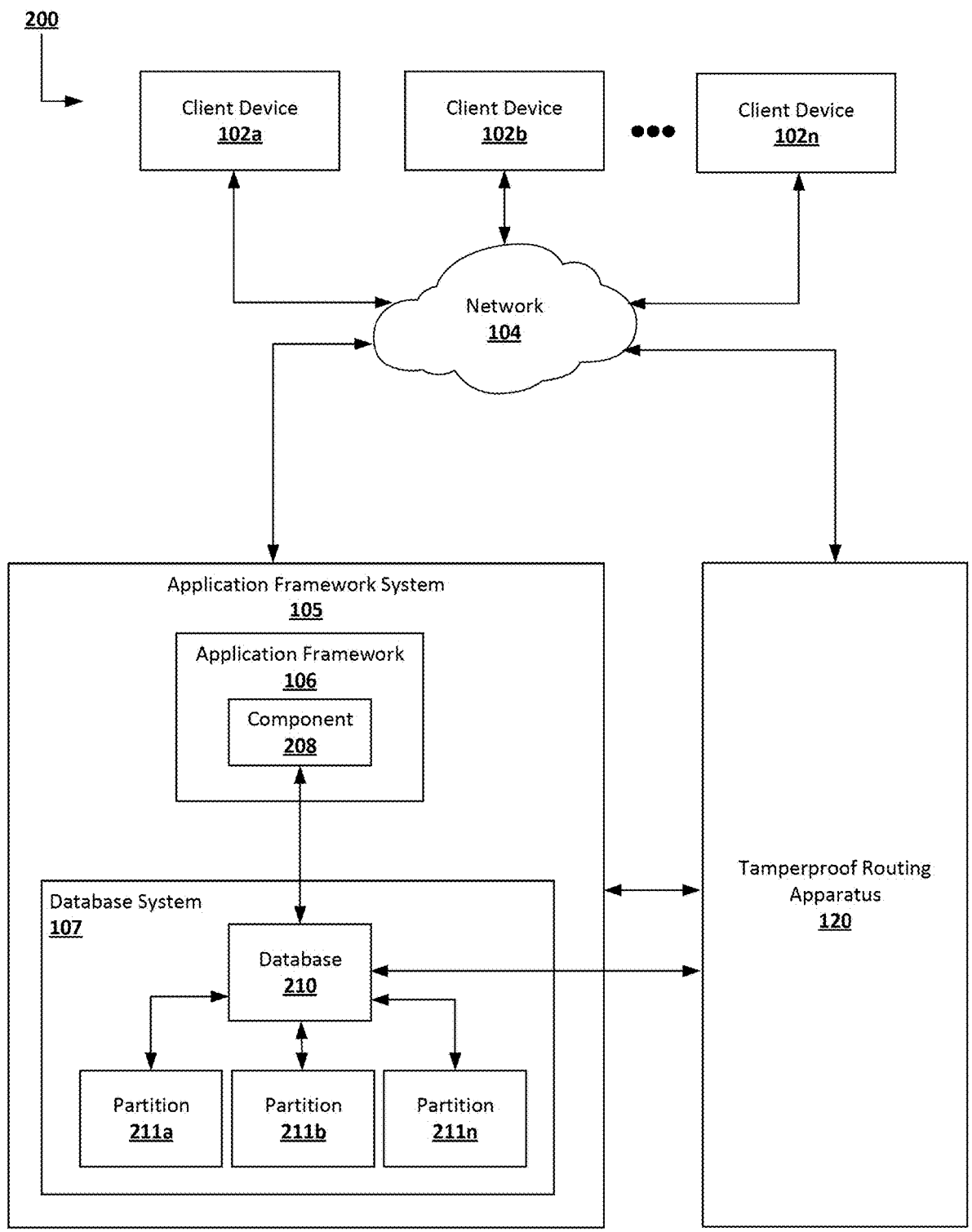
FIG. 2 is a block diagram of another example system within which one or more embodiments of the present disclosure may operate.

FIG. 2 illustrates an example system architecture 200 within which embodiments of the present disclosure may operate. The system architecture 200 includes the application framework system 105, application framework 106, database system 107, client devices 102*a-n*, network 104, and tamperproof routing apparatus 120. In one or more embodiments, the application framework 106 includes a component 208. For example, the component 208 may be a component (e.g., an application component or an application service) offered by application framework 106. In one or more embodiments, the component 208 is associated with a database 210 of database system 107. The database 210 may be associated with one or more partitions 211*a-n*. For example, data associated with component 208 may be stored in at least one of the partitions 211*a-n* of the database 210.

In various embodiments, the tamperproof routing apparatus 120 is communicatively coupled to the application framework system 105 and/or the database 210 for direct management of the application framework system 105 and/or the database 210. For example, the tamperproof routing apparatus 120 may be configured to allocate one or more of the partitions 211*a-n* to the component 208 of application framework 106. Additionally, the tamperproof routing apparatus 120 may be configured to manage, authorize access, update, delete, merge, duplicate, and/or the like with respect to the one or more partitions 211*a-n* of the database 210.

In some embodiments, the tamperproof routing apparatus 120 may be configured to manage the database 210 of database system 107. For example, the tamperproof routing apparatus 120 may manage validation of data access requests and/or partition keys associated with the database 210 of database system 107. In some embodiments, the tamperproof routing apparatus 120 is configured to manage context information related to data access requests and/or the database system 107. For example, the tamperproof routing apparatus 120 may authorize access to data and/or initiate routing data related to the component 208 and/or an associated partition 211*a-n* based on encrypted context for a requesting entity identifier associated with a data access request. In some embodiments, the tamperproof routing apparatus 120 may be configured to manage the component 208, for example, by authorizing access to data associated with component 208 based on encrypted context for a requesting entity identifier associated with a data access request.

Figure 3:
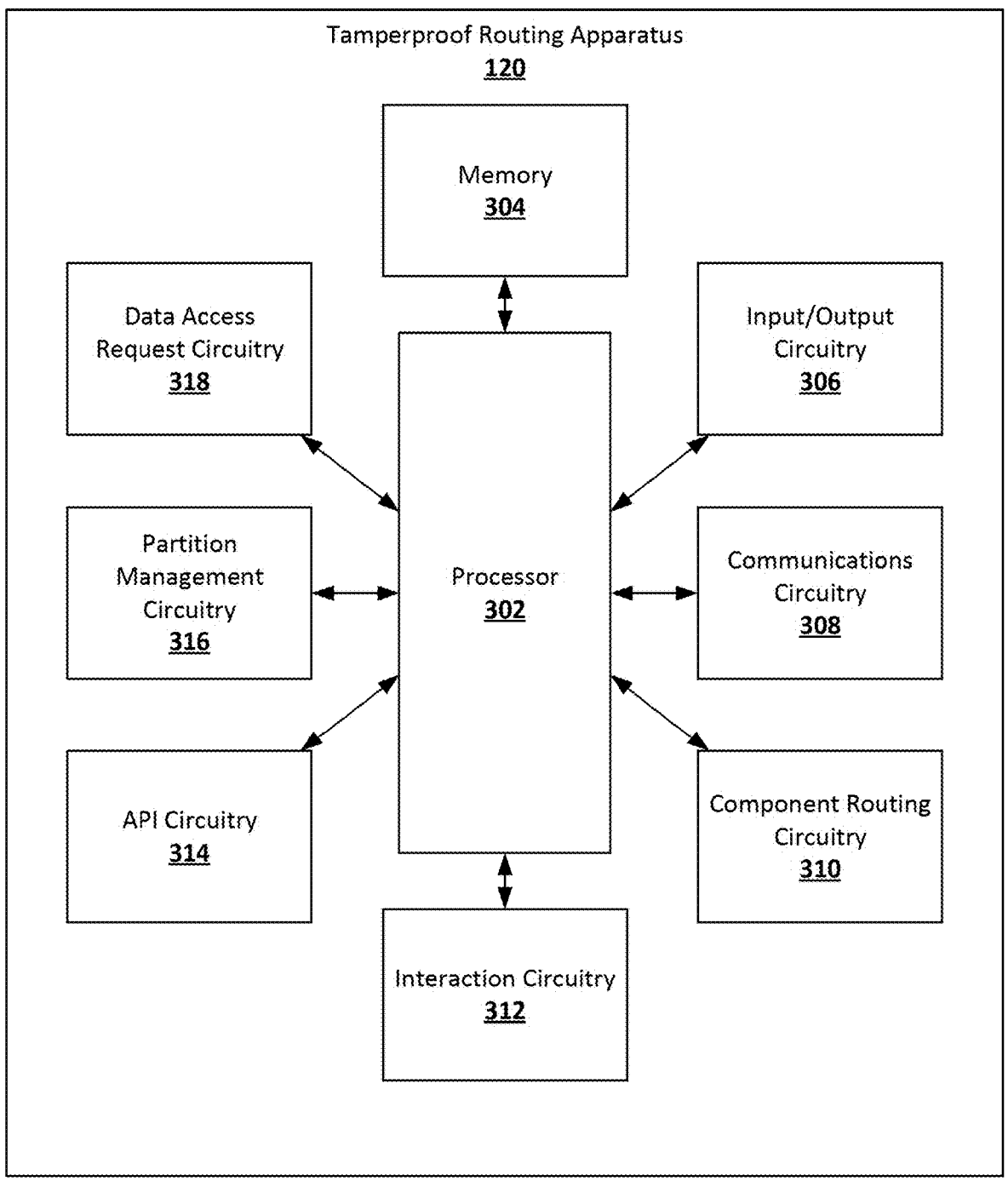
FIG. 3 is a block diagram of an example tamperproof routing apparatus configured in accordance with one or more embodiments of the present disclosure.

The tamperproof routing apparatus 120 may be embodied by one or more computing systems, such the tamperproof routing apparatus 120 illustrated in FIG. 3. In one or more embodiments, the tamperproof routing apparatus 120 may include processor 302, memory 304, input/output circuitry 306, communications circuitry 308, component routing circuitry 310, interaction circuitry 312, API circuitry 314, partition management circuitry 316, and/or data access request circuitry 318. The tamperproof routing apparatus 120 may be configured to execute the operations described herein. Although these components 302-318 are described with respect to functional limitations, it should be understood that the particular implementations necessarily include the use of particular hardware. It should also be understood that certain of these components 302-318 may include similar or common hardware. For example, two sets of circuitries may both leverage use of the same processor, network interface, storage medium, or the like to perform their associated functions, such that duplicate hardware is not required for each set of circuitries.

In some embodiments, the processor 302 (and/or co-processor or any other processing circuitry assisting or otherwise associated with the processor) may be in communication with the memory 304 via a bus for passing information among components of the apparatus. The memory 304 is non-transitory and may include, for example, one or more volatile and/or non-volatile memories. In other words, for example, the memory 304 may be an electronic storage device (e.g., a computer-readable storage medium). The memory 304 may be configured to store information, data, content, applications, instructions, or the like for enabling the apparatus to carry out various functions in accordance with example embodiments of the present disclosure.

The processor 302 may be embodied in a number of different ways and may, for example, include one or more processing devices configured to perform independently. In some preferred and non-limiting embodiments, the processor 302 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 302 may be configured to execute instructions stored in the memory 304 or otherwise accessible to the processor 302. In some preferred and non-limiting embodiments, the processor 302 may be configured to execute hard-coded functionalities. As such, whether configured by hardware or software methods, or by a combination thereof, the processor 302 may represent an entity (e.g., physically embodied in circuitry) capable of performing operations according to an embodiment of the present disclosure while configured accordingly. Alternatively, as another example, when the processor 302 is embodied as an executor of software instructions, the instructions may specifically configure the processor 302 to perform the algorithms and/or operations described herein when the instructions are executed.

In some embodiments, the tamperproof routing apparatus 120 may include input/output circuitry 306 that may, in turn, be in communication with processor 302 to provide output to the user and, in some embodiments, to receive an indication of a user input. The input/output circuitry 306 may comprise a user interface and may include a display, and may comprise a web user interface, a mobile application, a query-initiating computing device, a kiosk, or the like. In some embodiments, the input/output circuitry 306 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

The communications circuitry 308 may be any means such as a device or circuitry embodied in either hardware or a combination of hardware and software that is configured to receive and/or transmit data from/to a network and/or any other device, circuitry, or module in communication with the tamperproof routing apparatus 120. In this regard, the communications circuitry 308 may include, for example, a network interface for enabling communications with a wired or wireless communication network. For example, the communications circuitry 308 may include one or more network interface cards, antennae, buses, switches, routers, modems, and supporting hardware and/or software, or any other device suitable for enabling communications via a network. Additionally or alternatively, the communications circuitry 308 may include the circuitry for interacting with the antenna/antennae to cause transmission of signals via the antenna/antennae or to handle receipt of signals received via the antenna/antennae.

The component routing circuitry 310 may be any means such as a device or circuitry embodied in either hardware or a combination of hardware and software that is configured to interact with components of the application framework 106. In some embodiments, the component routing circuitry 310 may act as an intermediary for one or more components of the application framework 106. For example, the component routing circuitry 310 may receive and process requests, call, messages, and/or the like for one or more components of the application framework 106. In some embodiments, the component routing circuitry 310 may support data routing, traffic control, security, optimization, and/or the like for component 208 of application framework 106. For example, component routing circuitry 310 may receive a request and perform one or more subsequent actions based on the request. In some embodiments, component routing circuitry 310 may provide functionality of a service proxy for one or more components of the application framework 106.

In some embodiments, the database system 107 may comprise one or more of a single unified repository, a single partitioned repository, or a plurality of isolated repositories comprising one or more partitions. An example embodiment of database system 107 may comprise separate partitions 211a-n for isolating information for respective component identifiers. The interaction circuitry 312 may also be configured to generate access logs and/or historical data including information associated with a particular computing device, component, component object, the like, or combinations thereof.

In some embodiments, the database system 107 includes existing databases containing relationship data. In some embodiments, the one or more databases 109 of the database system 107 are specific to a component of the application framework system 105 and do not contain relationships across multiple components. In some embodiments, the one or more databases 109 of the database system 107 are shared across multiple components of the application framework. For example, a first component may be associated with a first partition of a database 109 and a second component may be associated with a second partition of the same database 109. In such an embodiment, component routing circuitry 310 may be used to determine appropriate routing between the components and their respective partitions of the one or more databases 109. In one or more embodiments, the component routing circuitry 310 is configured to connect data across a plurality of components of the application framework system 105.

The interaction circuitry 312 may be any means such as a device or circuitry embodied in either hardware or a combination of hardware and software that is configured to interact with the application framework system 105 and/or the one or more client devices 102a-n. In various embodiments, the interaction circuitry 312 may monitor, analyze, and/or process data associated with the application framework system 105 such as, for example, data stored in the database system 107 and/or data related to a collaborative application. For example, in various embodiments, the interaction circuitry 312 may monitor event streams associated with the application framework 106 to detect respective candidate actions related to components of the application framework 106. In certain embodiments, the interaction circuitry 312 may be configured to retrieve metadata associated with the application framework 106 and/or the database system 107 to facilitate detection of respective candidate actions related to components of the application framework 106. The metadata may include, for example, data associated with relationships, sources, targets, ownership, consumption, libraries, activities, attributes, incidents, communication channels, dashboards, data repositories, labels, descriptions, and/or other data related to the application framework 106 and/or the database system 107.

In some embodiments, to facilitate monitoring of event streams, the communications circuitry 308 may be configured to ping one or more computing devices of the application framework 106, such as via an internet control message protocol, to receive information related to one or more components of the application framework 106. In some embodiments, to obtain event objects associated with the one or more components, the communications circuitry 308 utilizes the communications circuitry 308 to transmit one or more API calls to one or more API servers associated with the noted client devices.

The API circuitry 314 may be any means such as a device or circuitry embodied in either hardware or a combination of hardware and software that is configured to manage operations of various embodiments described herein. In various embodiments, the API circuitry 314 may be configured to interact with the application framework 106 and/or the tamperproof routing apparatus 120. For example, the API circuitry 314 may be configured to manage the lifecycle of various components of the application framework 106. Additionally or alternatively, the API circuitry 314 may be configured to retrieve metrics related to the resources consumed by partitions of the database system 107. Additionally or alternatively, the API circuitry 314 may be configured to support partition management and may be utilized by one or more other circuitries of the tamperproof routing apparatus 120 to create a partition, delete a partition, migrate a partition between components of the application framework 106, and or the like.

The partition management circuitry 316 may be any means such as a device or circuitry embodied in either hardware or a combination of hardware and software that is configured to generate and manage a partition set and/or partition of a database system 107. For example, partition management circuitry 316 may be configured to generate, merge, migrate, duplicate, delete, update, and/or the like, a partition of a partition set. In some embodiments, partition management circuitry 316 is configured to call a control-plane API to perform one or more operations associated with the partition management circuitry 316. In some embodiments, the partition management circuitry 316 may be any means such as a device or circuitry embodied in either hardware or a combination of hardware and software that is configured to manage data stored in the one or more partitions 211a-n.

The data access request circuitry 318 may be any means such as a device or circuitry embodied in either hardware or a combination of hardware and software that is configured to manage one or more data access requests associated with the application framework 106. For example, in one or more embodiments, the data access request circuitry 318 may receive a data access request to access data within the one or more partitions 211a-n. In various embodiments, the data access request may be associated with an encrypted context for a requesting entity identifier associated with the data access request. In some embodiments, the requesting entity identifier may correspond to a tenant identifier associated with the application framework 106. In one or more embodiments, the data access request circuitry 318 may additionally or alternatively identify a partition identifier and/or an encrypted partition key for the one or more partitions 211a-n associated with the data access request. In one or more embodiments, the data access request circuitry 318 may additionally or alternatively generate a candidate validation partition key for the one or more partitions 211a-n associated with the data access request based at least in part on the encrypted partition key, the encrypted context, and the partition identifier. In one or more embodiments, the data access request circuitry 318 may additionally or alternatively validate the candidate validation partition key based at least in part on a comparison between the candidate validation partition key and a validation partition key for the one or more partitions 211a-n associated with the data access request. Additionally, in one or more embodiments, the data access request circuitry 318 may process the data access request in response to a determination that the candidate validation partition key is valid.

In some embodiments, one or more external systems (such as a remote cloud computing and/or data storage system) may also be leveraged to provide at least some of the functionality discussed herein.

Figure 4:
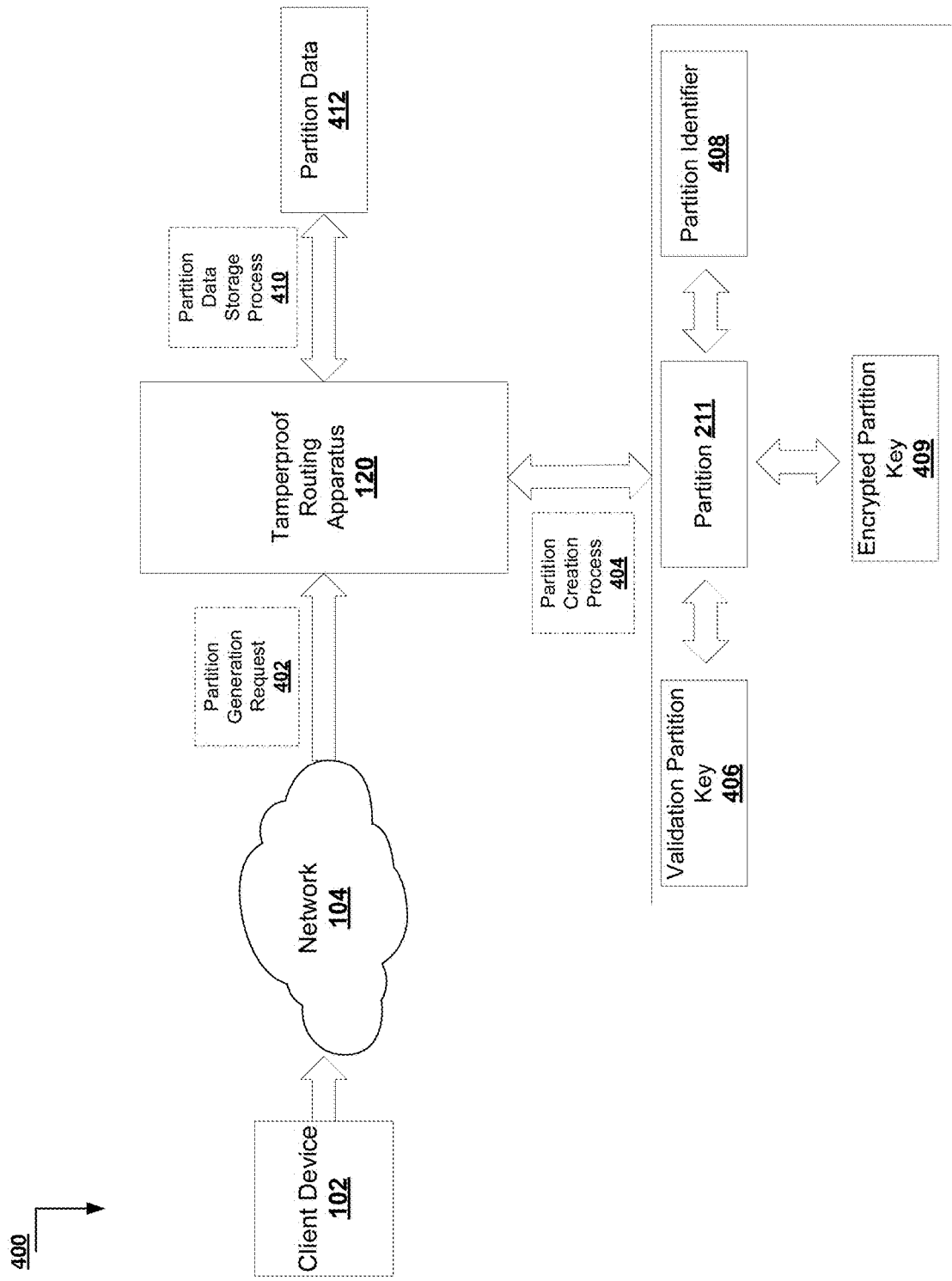
FIG. 4 illustrates an example data flow related to a tamperproof routing apparatus in accordance with one or more embodiments of the present disclosure.

Referring to FIG. 4, an example data flow 400 is presented in accordance with one or more embodiments of the present disclosure. The data flow 400 depicts functionality between various sub-systems of the present disclosure, including the client device 102, the network 104, the tamperproof routing apparatus 120, the partition 211, a partition identifier 408, validation partition key 406, and/or partition data 412. In one or more embodiments, the data flow 400 may be associated with a process for generating one or more partitions associated with the database 210. In one or more embodiments, the tamperproof routing apparatus 120 may receive, via the network 104, a partition generation request 402 from the client device 102. The partition generation request 402 may be, for example, a request to generate a new partition 211 for a tenant, component, or the like, of the application framework 106. In some embodiments, the partition generation request 402 may include and/or otherwise be associated with a secret key and/or encrypted context. In some embodiments, the partition generation request 402 may be configured as an interaction signal. In some embodiments, the partition generation request 402 may be generated via a graphical control element of an electronic interface of the client device 102.

In some embodiments, the tamperproof routing apparatus 120 may perform one or more operations in response to the partition generation request 402. For example, the tamperproof routing apparatus 120 may perform the partition creation process 404 in response to the partition generation request 402. Via the partition creation process 404, the tamperproof routing apparatus 120 may generate the partition 211, the partition identifier 408, and/or the validation partition key 406. The partition identifier 408 and the validation partition key 406 may be associated with the partition 211. In some embodiments, the tamperproof routing apparatus 120 may generate an encrypted partition key 409 based on a secret key and an encrypted context associated with the partition generation request 402. In some embodiments, the partition identifier 408 may be used to uniquely identify the partition 211. For example, the partition identifier 408 may be used to uniquely identify the partition 211 in an API call, data access request, context service call, and/or another network communication of the application framework 106.

In some embodiments, the tamperproof routing apparatus 120 may perform the partition data storage process 410 in response to the partition generation request 402. For example, the tamperproof routing apparatus 120 may store the partition data 412 in one or more data storage mediums. The partition data 412 may be data associated with the partition creation process 404, the partition generation request 402, and/or the like. For example, the partition data 412 may include and/or be otherwise associated with the validation partition key 406, the partition identifier 408, an encrypted context, the encrypted partition key 409, and/or the like. In some examples, the validation partition key 406 may be stored and used by the tamperproof routing apparatus 120 to validate requests (e.g., data access requests) associated with the partition 211. In another example, the partition identifier 408 may be associated with the encrypted partition key 409 and stored for later retrieval.

In some embodiments, the tamperproof routing apparatus 120 may generate the partition 211 in response to the partition generation request 402. Additionally, the partition generation request 402 may include a secret key and/or may be associated with an encrypted context for a requesting entity identifier associated with the partition generation request 402. In some embodiments, the tamperproof routing apparatus 120 may generate the encrypted partition key 409 based on the secret key and/or the encrypted context. Additionally, the tamperproof routing apparatus 120 may generate the partition identifier 408 and/or the validation partition key 406. In some embodiments, the tamperproof routing apparatus 120 may generate the validation partition key 406 based on a hash mapping between the partition identifier 408 and the secret key associated with a partition generation request 402. In some embodiments, the tamperproof routing apparatus 120 may generate one or more relationship mappings between the partition 211, the partition identifier 408, the encrypted partition key 409, and/or the validation partition key 406.

In some embodiments, the tamperproof routing apparatus 120 may generate the partition 211 in response to the partition generation request 402. Additionally, the partition generation request 402 may be associated with the encrypted context for the requesting entity identifier associated with the partition generation request 402. In some embodiments, the tamperproof routing apparatus 120 may determine the secret key for the partition generation request. For example, the tamperproof routing apparatus 120 may generate the secret key based on a random number generator, one or more hashing techniques, and/or one or more other techniques. Additionally, the tamperproof routing apparatus 120 may generate the encrypted partition key 409 based on the secret key and/or the encrypted context. The tamperproof routing apparatus 120 may additionally generate the partition identifier 408 and/or the validation partition key 406. In some embodiments, the tamperproof routing apparatus 120 may generate the validation partition key 406 based on a hash mapping between the partition identifier 408 and the secret key determined for the partition generation request 402. In some embodiments, the tamperproof routing apparatus 120 may generate one or more relationship mappings between the partition 211, the partition identifier 408, the encrypted partition key 409, and/or the validation partition key 406.

Figure 5:
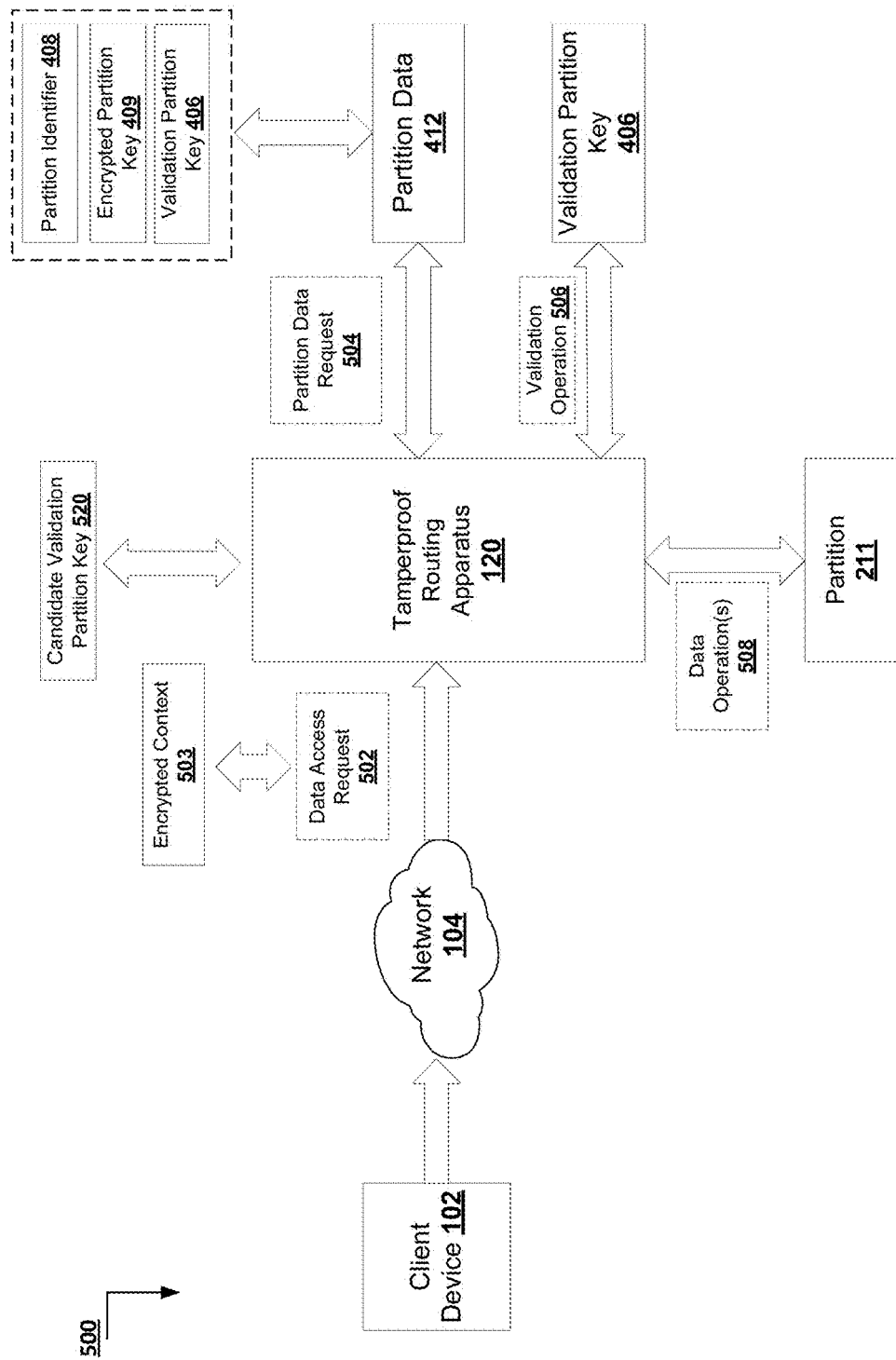
FIG. 5 illustrates another example data flow related to a tamperproof routing apparatus in accordance with one or more embodiments of the present disclosure.

Referring to FIG. 5, an example data flow 500 is presented in accordance with one or more embodiments of the present disclosure. The data flow 500 depicts functionality between various sub-systems of the present disclosure, including the client device 102, the network 104, the tamperproof routing apparatus 120, the partition data 412, the validation partition key 406, and/or the partition 211. In one or more embodiments, the data flow 500 may be associated with a process for accessing and/or modifying data stored in one or more partitions associated with the database 210. In one or more embodiments, the tamperproof routing apparatus 120 may receive a data access request 502 via network 104 from client device 102. The data access request 502 may, for example, be a request to access and/or modify particular data (e.g., a CRUD request) stored within the partition 211 for a tenant, component, and/or the like, of the application framework 106. In some embodiments, the data access request 502 may include or otherwise be associated with routing information such as a component archetype data structure, and/or the like, usable by the tamperproof routing apparatus 120 to perform routing for the data access request 502.

In some embodiments, the data access request 502 may additionally or alternatively include or otherwise be associated with an encrypted context 503 for a requesting entity identifier associated with the data access request 502. In some embodiments, the encrypted context 503 may be usable by the tamperproof routing apparatus 120 to validate the data access request 502 and/or to perform routing for the data access request 502. For example, the tamperproof routing apparatus 120 may determine whether the encrypted context 503 corresponds to a previous determined encrypted context associated with the partition generation request 402. In some embodiments, the encrypted context 503 may be associated with a tenant identifier for the data stored within the partition 211. In some embodiments, the tenant identifier may be associated with configuration metadata for a multi-component system of the application framework 106. The configuration metadata may include configuration information for the tenant identifier such as, for example, which of the one or more databases 109 is associated with the tenant identifier, an identifier for one or more components (e.g., services and/or microservices) the tenant identifier has access to, which features of the application framework 106 the tenant identifier has access to, and/or other information associated with the tenant identifier. In some embodiments, the data access request 502 may be configured as an interaction signal. In some embodiments, the data access request 502 may be generated via a graphical control element of an electronic interface of the client device 102.

In some embodiments, the tamperproof routing apparatus 120 may perform one or more operations in response to the data access request 502. For example, the tamperproof routing apparatus 120 may perform the partition data request 504, validation operation 506, and/or one or more data operations 508. In the partition data request 504, the tamperproof routing apparatus 120 may, for example, retrieve data for the partition 211 from partition data 412. In some embodiments, the partition data 412 may include or otherwise be associated with a partition identifier (e.g., the partition identifier 408), an encrypted partition key (e.g., the encrypted partition key 409), a validation partition key (e.g., the validation partition key 406), and/or the like, associated with the partition 211. In some embodiments, the tamperproof routing apparatus 120 may use the encrypted context 503 associated with the data access request 502 to decrypt the encrypted partition key 409. Additionally, the tamperproof routing apparatus 120 may use the resulting decrypted partition key in combination with the partition identifier 408 to generate a candidate validation partition key 520.

In some embodiments, in the validation operation 506, the tamperproof routing apparatus 120 may compare the validation partition key 406 to the candidate validation partition key 520. For example, the tamperproof routing apparatus 120 may determine whether the candidate validation partition key 520 is valid. In some embodiments, the candidate validation partition key 520 may not match the validation partition key 406 if, for example, the encryption context associated with the data access request 502 does not correspond to the previously determined encryption context used to generate the validation partition key 406. Additionally or alternatively, the candidate validation partition key 520 may not match the validation partition key 406 if, for example, the partition identifier associated with the data access request 502 does not correspond to the partition identifier 408 associated with the partition 211 (e.g., the partition identifier included in the partition data 412 associated with the partition 211). In some embodiments, the tamperproof routing apparatus 120 may determine the partition identifier associated with the data access request 502 based on metadata included in or otherwise associated with the data access request 502. In some embodiments, in response to a determination that the candidate validation partition key 520 does not match the validation partition key 406 (e.g., that the candidate validation partition key 520 is invalid), the tamperproof routing apparatus 120 may discard the data access request 502. In some embodiments, in response to the determination that the candidate validation partition key 520 does not match the validation partition key 406, the tamperproof routing apparatus 120 may discard the data access request 502. Alternatively, in response to a determination that the candidate validation partition key 520 does match the validation partition key 406 (e.g., that the candidate validation partition key 520 is valid), the tamperproof routing apparatus 120 may process the data access request 502 at the partition 211. In some embodiments, in response to the determination that the candidate validation partition key 520 does match the validation partition key 406, the tamperproof routing apparatus 120 may perform the one or more data operations 508 at the partition 211 based at least in part on the data access request 502. For example, data of the partition 211 may be read, deleted, updated, or the like, based on the data access request 502.

In some embodiments, the tamperproof routing apparatus 120 may generate a decrypted partition key based on the encrypted partition key 409 and the encrypted context 503. Additionally, the tamperproof routing apparatus 120 may cache the decrypted partition key in association with the encrypted context 503. For example, the tamperproof routing apparatus 120 may store the decrypted partition key in the memory 304. In some embodiments, the tamperproof routing apparatus 120 may receive a new data access request (e.g., after receiving the data access request 502) to access data within the partition 211. As such, the tamperproof routing apparatus 120 may retrieve the cached decrypted partition key. Additionally, the tamperproof routing apparatus 120 may generate a new candidate validation partition key for the partition 211 based on the cached decrypted partition key and the partition identifier 408. In some embodiments, the tamperproof routing apparatus 120 may validate the new candidate validation partition key based on a comparison between the new candidate validation partition key and the validation partition key 406 associated with the partition 211. Additionally, the tamperproof routing apparatus 120 may process the new data access request in response to a determination that the new candidate validation partition key is valid.

Figure 6A:
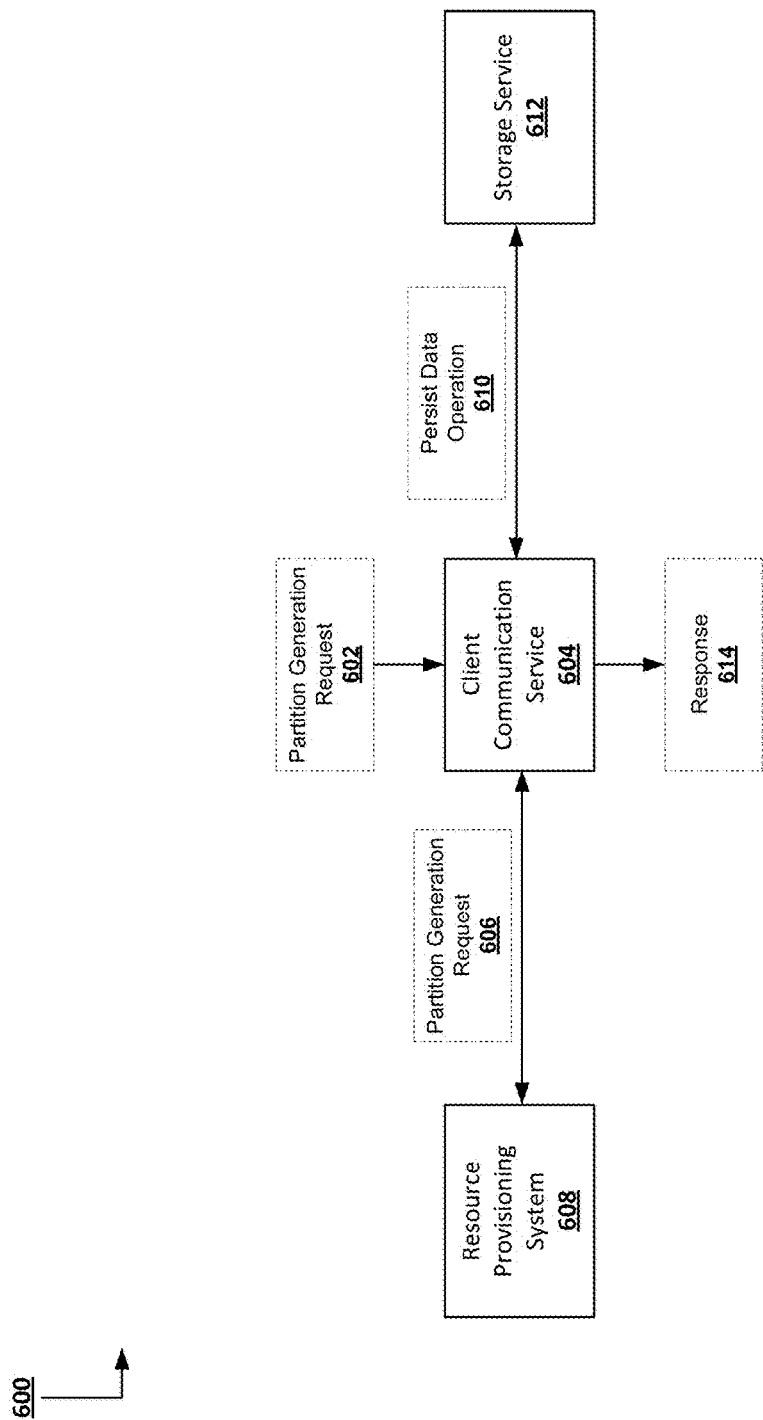
FIG. 6A illustrates an example application framework system in accordance with one or more embodiments of the present disclosure.

Referring to FIG. 6A, an example application framework system 600 is presented in accordance with one or more embodiments of the present disclosure. As shown, the application framework system 600 includes a client communication service 604, resource provisioning system 608, and storage service 612. In some embodiments, the client communication service 604 may receive a partition generation request 602. For example, the client communication service 604 may receive the partition generation request 602 (e.g., from a client device) initiated by a tenant, component, or the like. The partition generation request 602 may, for example, be a request to generate a new partition. In some embodiments, the partition generation request 602 may include or otherwise be associated with an encrypted context (e.g., a tenant identifier, a request context), a secret key, and/or the like.

In some embodiments, the client communication service 604 may perform one or more operations in response to the partition generation request 602. For example, the client communication service 604 may provide the partition generation request 606 to the resource provisioning system 608. The partition generation request 606 may be or be based on the partition generation request 602. The partition generation request 606 may include or otherwise be associated with the encrypted context, the secret key, and/or the like.

In some embodiments, the resource provisioning system 608 may be configured to generate and manage partitions. For example, the resource provisioning system 608 may receive the partition generation request 606 and, in response, generate a partition, partition identifier, validation partition key, and/or the like. In some embodiments, the resource provisioning system 608 may generate the validation key by, for example, hashing a combination of a secret key and a partition identifier. In some embodiments, the resource provisioning system 608 may store a validation partition key for later use in validating requests associated with a partition (e.g., data access requests). The resource provisioning system 608 may provide a response to the client communication service 604 to, for example, confirm the partition was successfully generated in response to the partition generation request 606. Additionally, or alternatively, the resource provisioning system 608 may provide a response to the client communication service 604 that includes or is associated with, for example, data associated with the partition (e.g., the partition identifier).

In some embodiments, the client communication service 604 may generate an encrypted partition key by, for example, using the encrypted context associated with the partition generation request 602 to encrypt the secret key. In some embodiments, the client communication service 604 may store data associated with the partition. For example, the client communication service 604 may perform a persist data operation 610 configured to store data associated with the partition at a storage service 612. Storage service 612 may, for example, be any database, datastore, record system, catalog, or the like, accessible by the client communication service 604. In some embodiments, the storage service 612 may provide a response to the client communication service 604 to, for example, confirm the persist data operation 610 was successful. In some embodiments, the client communication service 604 may later retrieve data associated with the partition from the storage service 612. In some embodiments, the client communication service 604 may provide a response 614 indicating, for example, the successful creation of the partition and/or persist data operation 610. For example, the client communication service 604 may provide response 614 to the requesting entity that provided the partition generation request 602 (e.g., a client device of a tenant).

Figure 6B:
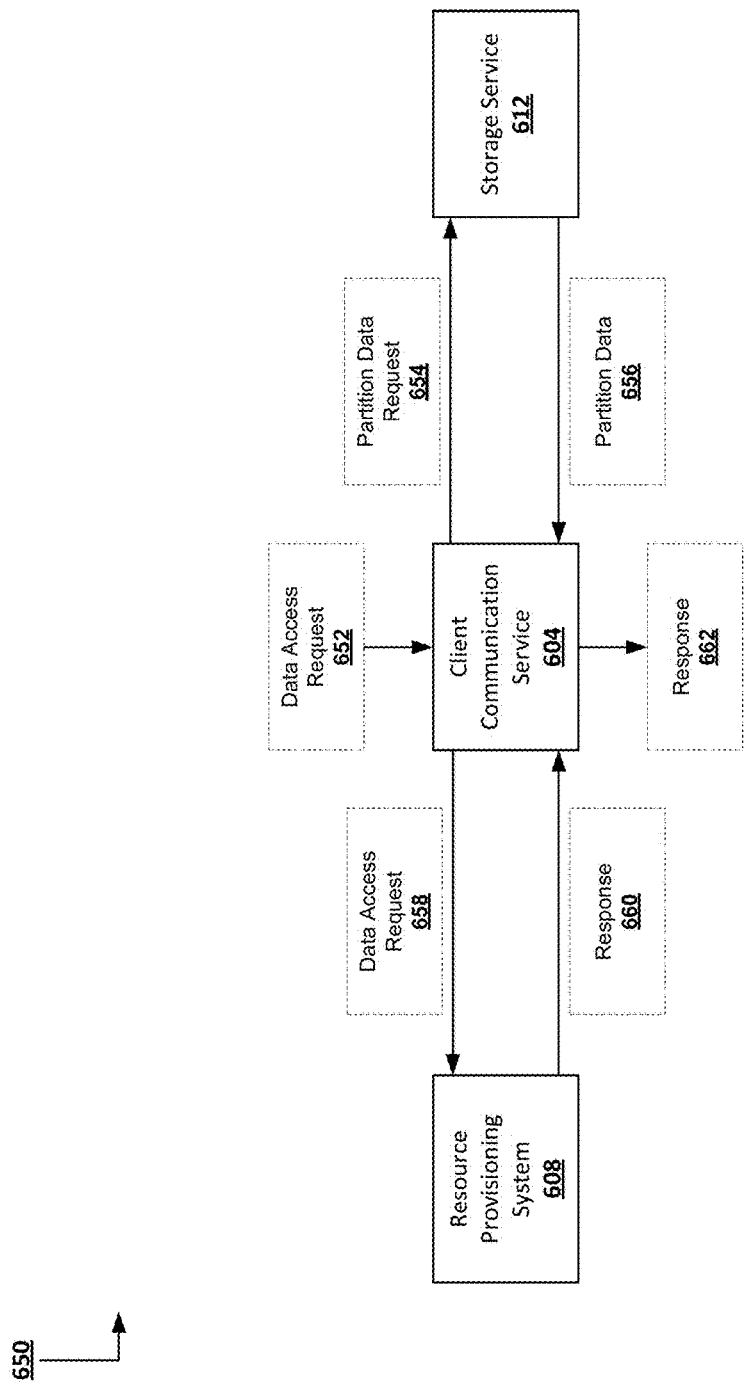
FIG. 6B illustrates another example application framework system in accordance with one or more embodiments of the present disclosure.

Referring to FIG. 6B, an example application framework system 650 is presented in accordance with one or more embodiments of the present disclosure. As shown, the application framework system 650 includes the client communication service 604, the resource provisioning system 608, and the storage service 612. In one or more embodiments, the client communication service 604 may receive the data access request 652. For example, the client communication service 604 may receive the data access request 652 (e.g., from a client device) initiated by a tenant, component, or the like. The data access request 652 may, for example, be a request to access some data (e.g., a CRUD request) stored within a partition. In some embodiments, the data access request 652 may include or otherwise be associated with routing information such as a component archetype data structure, an encrypted context (e.g., a tenant identifier, a request context), and/or the like, usable by the client communication service 604 to perform routing for the data access request 652.

In some embodiments, the client communication service 604 may perform one or more operations in response to the data access request 652. For example, the client communication service 604 may provide a partition data request 654 to storage service 612. The partition data request 654 may request or query data stored in the storage service 612. In some embodiments, the partition data request 654 may be configured to retrieve partition data 656 for a partition associated with the data access request 652. In some embodiments, the partition data 656 may include or otherwise be associated with the partition identifier, encrypted partition key, and/or the like, for the partition associated with the data access request 652.

In some embodiments, the client communication service 604 may use an encrypted context associated with the data access request 652 to decrypt the encrypted partition key resulting in a secret key. In some embodiments, the client communication service 604 may use the secret key in combination with the partition identifier to generate a candidate validation partition key. In some embodiments, if the decryption is successful, the client communication service 604 may provide the data access request 658 to the resource provisioning system 608. The data access request 658 may be or be based on the data access request 652. The data access request 658 may include or otherwise be associated with the encrypted context, the partition identifier, the secret key, the candidate validation partition key, and/or the like.

In some embodiments, the resource provisioning system 608 may receive the data access request 658 and perform a validation operation. For example, the resource provisioning system 608 may validate the data access request 658 by comparing a stored validation partition key for the partition associated with the data access request 658 against the candidate validation partition key. In some embodiments, the resource provisioning system 608 may compare the secret key and partition identifier associated with the data access request 658 with a stored secret key and partition identifier. In some embodiments, the resource provisioning system 608 may verify that the candidate validation partition key matches the validation partition key. In some embodiments, the resource provisioning system 608 may verify that the secret key and partition identifier associated with the data access request 658 matches the stored secret key and partition identifier. If the validation operation fails (e.g., any expected data is missing or mismatched), the resource provisioning system 608 may discard or deny the data access request. In some embodiments, if the validation operation succeeds, the resource provisioning system 608 may process the data access request 652 at the associated partition. For example, the partition may have data stored within read, deleted, updated, or the like, based on the data access request 658.

In some embodiments, the resource provisioning system 608 may provide response 660 to the client communication service 604 in response to the data access request 658. In some embodiments, the response 660 may indicate that the data access request 658 was processed, denied, or the like. The client communication service 604 may provide response 662 in response to response 660. For example, the client communication service 604 may provide response 662 to the requesting entity that provided the data access request 652 (e.g., a client device of a tenant).

Figure 7A:
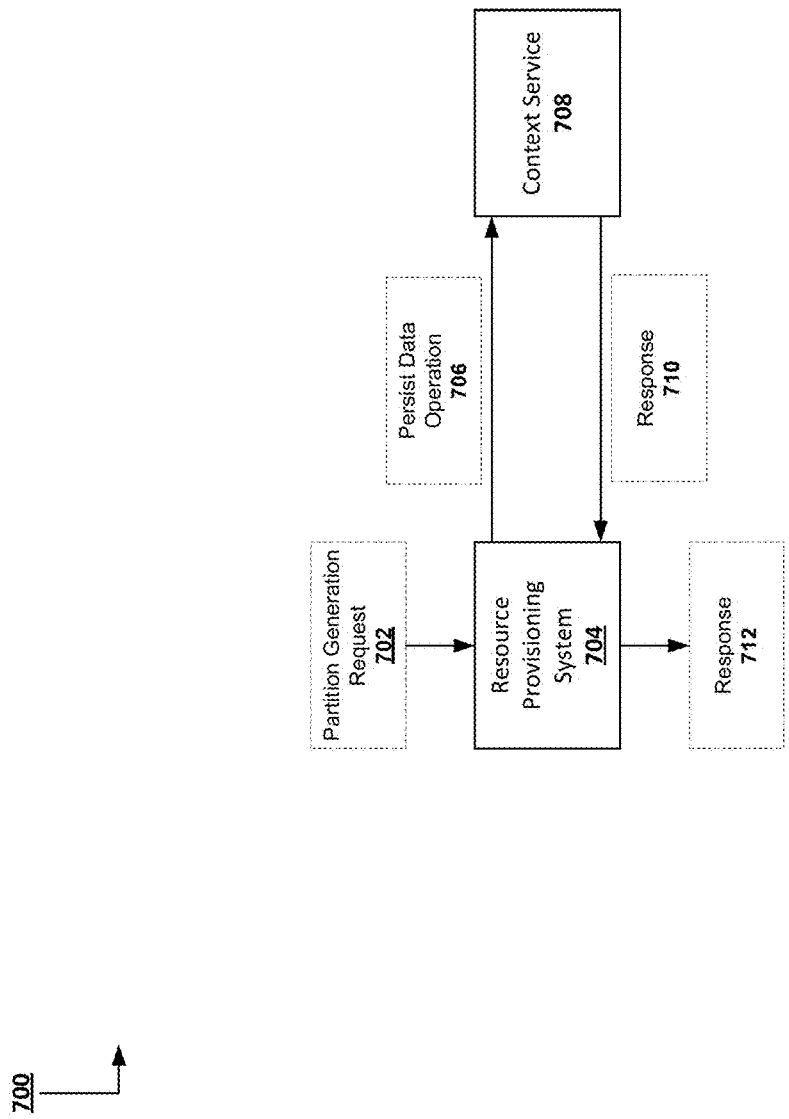
FIG. 7A illustrates an example application framework system in accordance with one or more embodiments of the present disclosure.

Referring to FIG. 7A, an example application framework system 700 is presented in accordance with one or more embodiments of the present disclosure. As shown, the application framework system 700 includes a resource provisioning system 704 and a context service 708. In some embodiments, the resource provisioning system 704 may receive a partition generation request 702. For example, the resource provisioning system 704 may receive the partition generation request 702 (e.g., from a client device) initiated by a tenant, component, or the like. The partition generation request 702 may, for example, be a request to generate a new partition. In some embodiments, the partition generation request 702 may include or otherwise be associated with an encrypted context (e.g., a tenant identifier, a request context), a secret key, and/or the like.

In some embodiments, the resource provisioning system 704 may perform one or more operations in response to the partition generation request 702. For example, the resource provisioning system 704 may generate a secret key associated with the partition generation request 702 (e.g., if the partition generation request does not include or is not associated with a secret key). In another example, the resource provisioning system 704 may generate an encrypted partition key associated with the partition generation request 702. For example, the resource provisioning system 704 may generate an encrypted partition key by encrypting a secret key using an encrypted context associated with the partition generation request 702. In some embodiments, the resource provisioning system 704 may generate or cause generation of a partition in response to the partition generation request 702.

In some embodiments, the resource provisioning system 704 may be configured to generate and manage partitions. For example, the resource provisioning system 704 may receive the partition generation request 702 and, in response, generate a partition, partition identifier, validation partition key, and/or the like. In some embodiments, the resource provisioning system 704 may decode a secret key by decrypting the encrypted partition key using the encrypted context. In some embodiments, the resource provisioning system 704 may generate a validation partition key by, for example, hashing a combination of a secret key and a partition identifier. In some embodiments, the resource provisioning system 704 may store a validation partition key for later use in validating requests associated with a partition (e.g., data access requests). The resource provisioning system 704 may provide a response to one or more components, subsystems, client devices, and/or the like, for example, to confirm the partition was successfully generated in response to the partition generation request 702. Additionally, or alternatively, the response may include or otherwise be associated with, for example, data associated with the partition generated (e.g., the partition identifier).

In some embodiments, the resource provisioning system 704 may store data associated with the partition. For example, the resource provisioning system 704 may perform a persist data operation 706 configured to store data associated with the partition at a context service 708. In some embodiments, the context service 708 may serve to organize, store, and make available data associated with the partition. In some embodiments, the context service 708 may provide data persistence of partition data, tenant data, component data, and/or the like. For example, the context service 708 may store the encrypted partition key, the partition identifier, and/or the like. In some embodiments, the context service 708 may provide, access, and transform data between various components and entities of the application framework. In some embodiments, the context service 708 may provide data persistence of partition data, tenant data, component data, and/or the like. For example, the context service 708 may provide a read-optimized view of associated data. In some embodiments, the context service 708 may be accessed or queried to retrieve data associated with generated partitions. In some embodiments, the context service 708 may provide a response 710 to the resource provisioning system 704 to, for example, confirm the persist data operation 706 was successful. In some embodiments, the resource provisioning system 704 may provide response 712 indicating, for example, the successful creation of the partition and/or persist data operation 706. For example, the resource provisioning system 704 may provide response 712 to the requesting entity that provided the partition generation request 702 (e.g., a client device of a tenant).

Figure 7B:
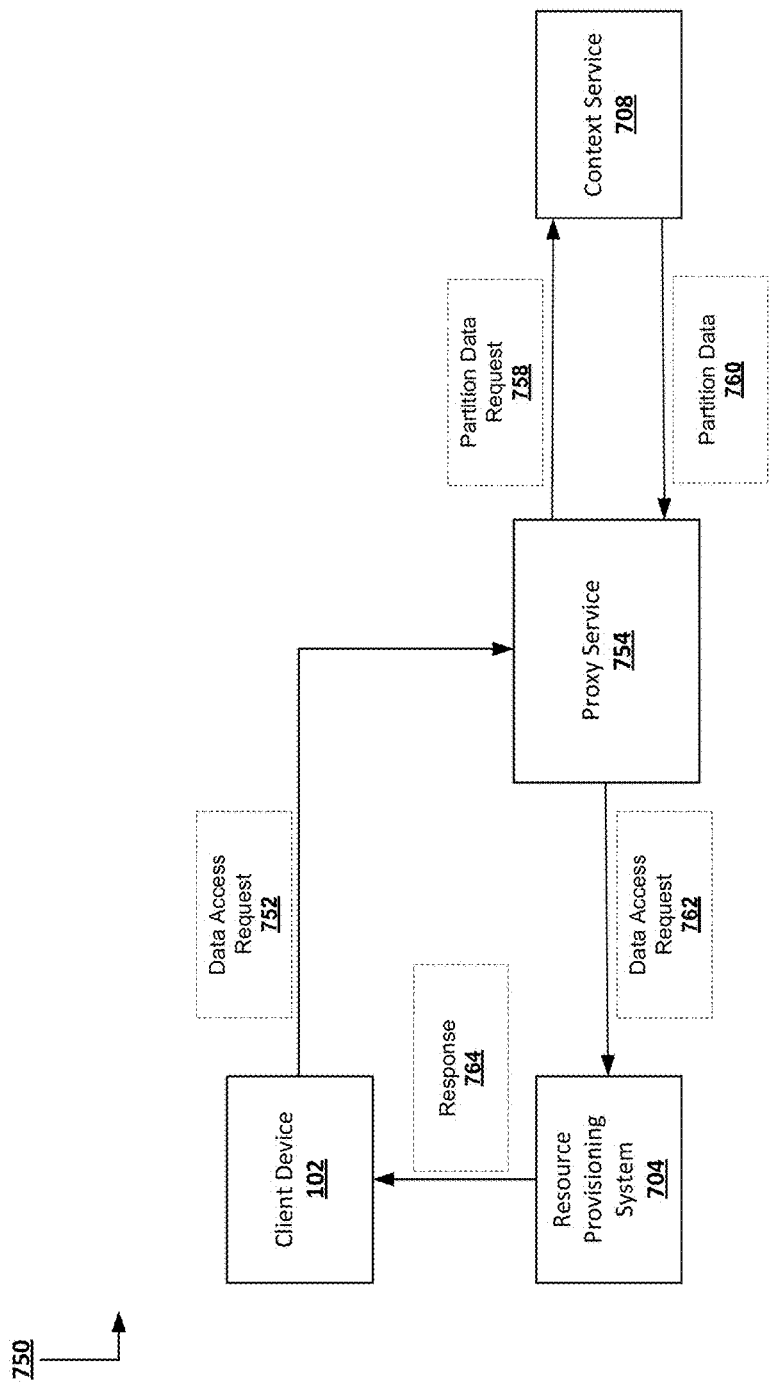
FIG. 7B illustrates another example application framework system in accordance with one or more embodiments of the present disclosure.

Referring to FIG. 7B, an example application framework system 750 is presented in accordance with one or more embodiments of the present disclosure. As shown, the application framework system 750 includes the client device 102, the proxy service 754, context service 708, and resource provisioning system 704. In one or more embodiments, the proxy service 754 may receive the data access request 752. For example, the proxy service 754 may receive the data access request 752 from the client device 102 initiated by a tenant, component, or the like. The data access request 752 may, for example, be a request to access some data (e.g., a CRUD request) stored within a partition. In some embodiments, the data access request 752 may include or otherwise be associated with routing information such as a component archetype data structure, an encrypted context (e.g., a tenant identifier, a request context), and/or the like, usable by the proxy service 754 to perform routing for the data access request 752.

In some embodiments, the proxy service 754 may perform one or more operations in response to the data access request 752. For example, the proxy service 754 may provide a partition data request 758 to context service 708. The partition data request 758 may request or query data stored in the context service 708. In some embodiments, the partition data request 758 may be configured to retrieve partition data 760 for a partition associated with the data access request 752. In some embodiments, the partition data 760 may include or otherwise be associated with the partition identifier, encrypted partition key, and/or the like, for the partition associated with the data access request 752. In some embodiments, routing associated with partition data request 758 to retrieve the partition data 760 may include the context service 708.

In some embodiments, the proxy service 754 may use an encrypted context associated with the data access request 752 to decrypt the encrypted partition key resulting in a secret key. In some embodiments, the proxy service 754 may use the secret key in combination with the partition identifier to generate a candidate validation partition key. In some embodiments, if the decryption is successful, the proxy service 754 may provide the data access request 762 to the resource provisioning system 704. The data access request 762 may be or be based on the data access request 752. The data access request 762 may include or otherwise be associated with the encrypted context, the partition identifier, the secret key, the candidate validation partition key, and/or the like. In some embodiments, the proxy service 754 may query the context service 708. For example, an auto decryptor for transformer service keys may be deployed within the context service 708. In some embodiments, the auto decryptor may decrypt the encrypted partition key to generate the secret key used to generate the candidate validation partition key. In some embodiments, the proxy service 754 may provide the data access request 762 to the resource provisioning system 704. The data access request 762 may be or be based on the data access request 752. The data access request 762 may include or otherwise be associated with the encrypted context, the partition identifier, the secret key, the candidate validation partition key, and/or the like.

In some embodiments, the resource provisioning system 704 may receive the data access request 762 and perform a validation operation. For example, the resource provisioning system 704 may validate the data access request 762 by comparing a stored validation partition key for the partition associated with the data access request 762 against the candidate validation partition key. In some embodiments, the resource provisioning system 704 may compare the secret key and partition identifier associated with the data access request 762 with a stored secret key and partition identifier. In some embodiments, the resource provisioning system 704 may verify that the candidate validation partition key matches the validation partition key. In some embodiments, the resource provisioning system 704 may verify that the secret key and partition identifier associated with the data access request 762 matches the stored secret key and partition identifier. If the validation operation fails (e.g., any expected data is missing or mismatched), the resource provisioning system 704 may discard or deny the data access request. In some embodiments, if the validation operation succeeds, the resource provisioning system 704 may process the data access request 762 at the associated partition. For example, the partition may have data stored within read, deleted, updated, or the like, based on the data access request 762.

In some embodiments, the resource provisioning system 704 may provide response 764 to the client device 102 in response to the data access request 762. In some embodiments, the response 764 may indicate that the data access request 762 was processed, denied, or the like.

Figure 8:
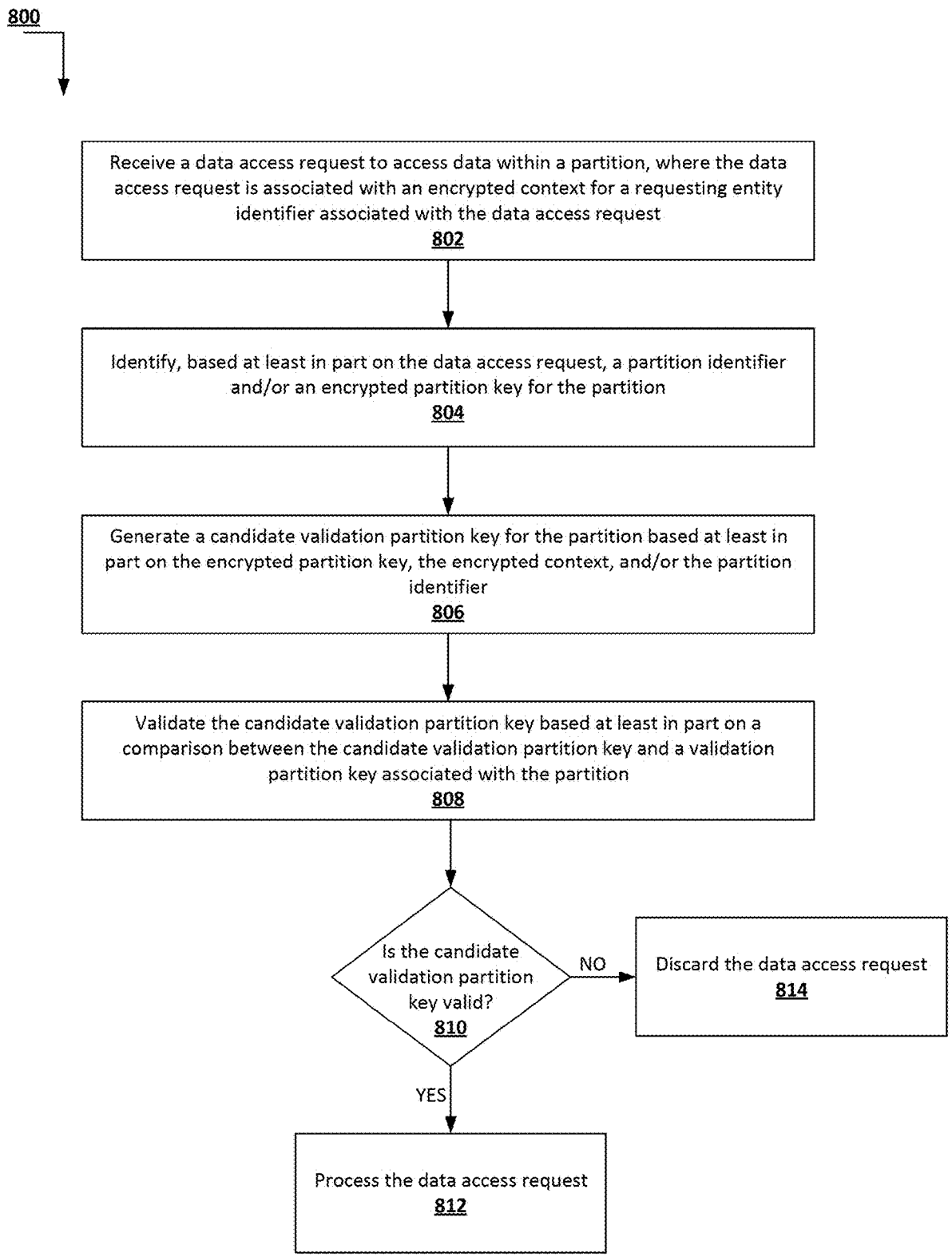
FIG. 8 is a flowchart diagram related to an example process for validating and processing a data access request of an application framework in accordance with one or more embodiments of the present disclosure.

FIG. 8 is a flowchart diagram of an example process 800 for validating and processing a data access request of an application framework in accordance with, for example, the tamperproof routing apparatus 120. Via the various operations of process 800, the tamperproof routing apparatus 120 may enhance the security and reliability of data of the application framework 106 and/or the database(s) 109. Via the various operations of process 800, the tamperproof routing apparatus 120 may additionally or alternatively enhance authorization of data accesses associated with the application framework 106 and/or the database(s) 109.

The process 800 begins at operation 802 where a data access request to access data within a partition is received, where the data access request is associated with an encrypted context for a requesting entity identifier associated with the data access request. In some embodiments, the encrypted context for the data access request is associated with a tenant identifier for the data within the partition. Additionally or alternatively, the tenant identifier is associated with configuration metadata for a multi-component system of an application framework. The process 800 additionally or alternatively includes an operation 804 that identifies, based at least in part on the data access request, a partition identifier and/or an encrypted partition key for the partition. The process 800 additionally or alternatively includes an operation 806 that generates a candidate validation partition key for the partition based at least in part on the encrypted partition key, the encrypted context, and/or the partition identifier. The process 800 additionally or alternatively includes an operation 808 that validates the candidate validation partition key based at least in part on a comparison between the candidate validation partition key and a validation partition key associated with the partition. The process 800 additionally or alternatively includes an operation 810 that determines whether the candidate validation partition key is valid. If yes (e.g., in response to a determination that the candidate validation partition key is valid), the process 800 additionally or alternatively includes an operation 810 that processes the data access request. However, if no (e.g., in response to a determination that the candidate validation partition key is invalid), the process 800 additionally or alternatively includes an operation 812 that discards the data access request.

In some embodiments, the process 800 additionally or alternatively includes, in response to the determination that the candidate validation partition key is valid, an operation to perform a data operation at the partition based at least in part on the data access request.

In some embodiments, the process 800 additionally or alternatively includes, in response to a determination that the candidate validation partition key is invalid, an operation to discard the data access request.

In some embodiments, the process 800 additionally or alternatively includes an operation to generate the partition in response to a partition generation request. In some embodiments, the partition generation request comprises a secret key and is associated with the encrypted context for the requesting entity identifier associated with the partition generation request. In some embodiments, the process 800 additionally or alternatively includes an operation to generate the encrypted partition key based at least in part on the secret key and the encrypted context. In some embodiments, the process 800 additionally or alternatively includes an operation to generate one or more relationship mappings between the partition, the partition identifier, the encrypted partition key, and the validation partition key.

In some embodiments, the process 800 additionally or alternatively includes an operation to generate the partition in response to a partition generation request. In some embodiments, the partition generation request is associated with the encrypted context for a requesting entity identifier associated with the partition generation request. In some embodiments, the process 800 additionally or alternatively includes an operation to determine a secret key for the partition generation request. In some embodiments, the process 800 additionally or alternatively includes an operation to generate the encrypted partition key based at least in part on the secret key and the encrypted context. In some embodiments, the process 800 additionally or alternatively includes an operation to generate one or more relationship mappings between the partition, the partition identifier, the encrypted partition key, and the validation partition key.

In some embodiments, the process 800 additionally or alternatively includes an operation to generate the validation partition key based on a hash mapping between the partition identifier and a secret key associated with a partition generation request.

In some embodiments, the process 800 additionally or alternatively includes an operation to generate a decrypted partition key based on the encrypted partition key and the encrypted context.

In some embodiments, the process 800 additionally or alternatively includes an operation to cache the decrypted partition key in association with the encrypted context. In some embodiments, the process 800 additionally or alternatively includes an operation to receive a second data access request to access data within the partition. In some embodiments, the process 800 additionally or alternatively includes an operation to retrieve the cached decrypted partition key. In some embodiments, the process 800 additionally or alternatively includes an operation to generate a second candidate validation partition key for the partition based at least in part on the cached decrypted partition key and the partition identifier. In some embodiments, the process 800 additionally or alternatively includes an operation to validate the second candidate validation partition key based at least in part on a comparison between the second candidate validation partition key and the validation partition key associated with the partition. In some embodiments, the process 800 additionally or alternatively includes an operation to process the second data access request in response to a determination that the second candidate validation partition key is valid.

In some embodiments, the process 800 additionally or alternatively includes an operation to determine the partition identifier based at least in part on metadata associated with the data access request.

Although example processing systems have been described in the figures herein, implementations of the subject matter and the functional operations described herein may be implemented in other types of digital electronic circuitry, or in computer software, firmware, or hardware, including the structures disclosed in this specification and their structural equivalents, or in combinations of one or more of them.

Embodiments of the subject matter and the operations described herein may be implemented in digital electronic circuitry, or in computer software, firmware, or hardware, including the structures disclosed in this specification and their structural equivalents, or in combinations of one or more of them. Embodiments of the subject matter described herein may be implemented as one or more computer programs, e.g., one or more modules of computer program instructions, encoded on computer-readable storage medium for execution by, or to control the operation of, information/data processing apparatus. Alternatively, or in addition, the program instructions may be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium may be, or be included in, a computer-readable storage device, a computer-readable storage substrate, a random or serial access memory array or device, or a combination of one or more of them. Moreover, while a computer-readable storage medium is not a propagated signal, a computer-readable storage medium may be a source or destination of computer program instructions encoded in an artificially-generated propagated signal. The computer-readable storage medium may also be, or be included in, one or more separate physical components or media (e.g., multiple CDs, disks, or other storage devices).

The operations described herein may be implemented as operations performed by an information/data processing apparatus on information/data stored on one or more computer-readable storage devices or received from other sources.

The term "apparatus" encompasses all kinds of apparatus, devices, and machines for processing data, including by way of example a programmable processor, a computer, a system on a chip, or multiple ones, or combinations, of the foregoing. The apparatus may include special purpose logic circuitry, e.g., an FPGA (field programmable gate array) or an ASIC (Application Specific Integrated Circuit). The apparatus may also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment may realize various different computing model infrastructures, such as web components, web services, web microservices, distributed computing and grid computing infrastructures.

A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described herein may be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments of the subject matter described herein may be implemented on a computer having a display device, e.g., a CRT (cathode ray tube) or LCD (liquid crystal display) monitor, for displaying information/data to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input. In addition, a computer may interact with a user by sending documents to and receiving documents from a device that is used by the user; for example, by sending web pages to a web browser on a user's query-initiating computing device in response to requests received from the web browser.

Embodiments of the subject matter described herein may be implemented in a computing system that includes a back-end component, e.g., as an information/data server, or that includes a middleware component, e.g., an application server, or that includes a front-end component, e.g., a query-initiating computing device having a graphical user interface or a web browser through which a user may interact with an implementation of the subject matter described herein, or any combination of one or more such back-end, middleware, or front-end components. The components of the system may be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system may include clients and servers. A client and server are generally remote from each other and typically interact through a communication network. The relationship of client and server arises by virtue of computer programs running on the respective computers and having a client-server relationship to each other. In some embodiments, a server transmits information/data (e.g., a Hypertext Markup Language (HTML) page) to a query-initiating computing device (e.g., for purposes of displaying information/data to and receiving user input from a user interacting with the query-initiating computing device). Information/data generated at the query-initiating computing device (e.g., a result of the user interaction) may be received from the query-initiating computing device at the server.

While this specification contains many specific implementation details, these should not be construed as limitations on the scope of any disclosures or of what may be claimed, but rather as description of features specific to particular embodiments of particular disclosures. Certain features that are described herein in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some embodiments be excised from the combination, and the claimed combination may be directed to a sub-combination or variation of a sub-combination.

Similarly, while operations are depicted in the drawings in a particular order, this should not be understood as requiring that such operations be performed in the particular order shown or in incremental order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems may generally be integrated together in a product or packaged into multiple products.

Thus, particular embodiments of the subject matter have been described. Other embodiments are within the scope of the following claims. In some embodiments, the actions recited in the claims may be performed in a different order and still achieve desirable results. In addition, the processes depicted in the accompanying figures do not necessarily require the particular order shown, or incremental order, to achieve desirable results, unless described otherwise. In certain implementations, multitasking and parallel processing may be advantageous.

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed is:

1. An apparatus comprising one or more processors and one or more storage devices storing instructions that are operable, when executed by the one or more processors, to cause the one or more processors to:
   receive a data access request to access data within a partition, wherein the data access request is associated with an encrypted context for a requesting entity identifier associated with the data access request;
   identify, based at least in part on the data access request, a partition identifier and an encrypted partition key for the partition;
   generate a candidate validation partition key for the partition based at least in part on the encrypted partition key, the encrypted context, and the partition identifier;
   validate the candidate validation partition key based at least in part on a comparison between the candidate validation partition key and a validation partition key associated with the partition; and
   process the data access request in response to a determination that the candidate validation partition key is valid.

2. The apparatus of claim 1, wherein the instructions are operable, when executed by the one or more processors, to further cause the one or more processors to:
   in response to the determination that the candidate validation partition key is valid, perform a data operation at the partition based at least in part on the data access request.

3. The apparatus of claim 1, wherein the instructions are operable, when executed by the one or more processors, to further cause the one or more processors to:
   in response to a determination that the candidate validation partition key is invalid, discard the data access request.

4. The apparatus of claim 1, wherein the instructions are operable, when executed by the one or more processors, to further cause the one or more processors to:
   generate the partition in response to a partition generation request, wherein the partition generation request comprises a secret key and is associated with the encrypted context for the requesting entity identifier associated with the partition generation request;
   generate the encrypted partition key based at least in part on the secret key and the encrypted context; and
   generate one or more relationship mappings between the partition, the partition identifier, the encrypted partition key, and the validation partition key.

5. The apparatus of claim 1, wherein the instructions are operable, when executed by the one or more processors, to further cause the one or more processors to:
   generate the partition in response to a partition generation request, wherein the partition generation request is associated with the encrypted context for a requesting entity identifier associated with the partition generation request;
   determine a secret key for the partition generation request;
   generate the encrypted partition key based at least in part on the secret key and the encrypted context; and
   generate one or more relationship mappings between the partition, the partition identifier, the encrypted partition key, and the validation partition key.

6. The apparatus of claim 1, wherein the instructions are operable, when executed by the one or more processors, to further cause the one or more processors to:
   generate the validation partition key based on a hash mapping between the partition identifier and a secret key associated with a partition generation request.

7. The apparatus of claim 1, wherein the instructions are operable, when executed by the one or more processors, to further cause the one or more processors to:
   generate a decrypted partition key based on the encrypted partition key and the encrypted context;
   cache the decrypted partition key in association with the encrypted context;
   receive a second data access request to access data within the partition;
   retrieve the cached decrypted partition key;

generate a second candidate validation partition key for the partition based at least in part on the cached decrypted partition key and the partition identifier;
validate the second candidate validation partition key based at least in part on a comparison between the second candidate validation partition key and the validation partition key associated with the partition; and
process the second data access request in response to a determination that the second candidate validation partition key is valid.

8. The apparatus of claim 1, wherein the instructions are operable, when executed by the one or more processors, to further cause the one or more processors to:
determine the partition identifier based at least in part on metadata associated with the data access request.

9. The apparatus of claim 1, wherein the encrypted context for the data access request is associated with a tenant identifier for the data within the partition, and wherein the tenant identifier is associated with configuration metadata for a multi-component system of an application framework.

10. A computer-implemented method, comprising:
receiving a data access request to access data within a partition, wherein the data access request is associated with an encrypted context for a requesting entity identifier associated with the data access request;
identifying, based at least in part on the data access request, a partition identifier and an encrypted partition key for the partition;
generating a candidate validation partition key for the partition based at least in part on the encrypted partition key, the encrypted context, and the partition identifier;
validating the candidate validation partition key based at least in part on a comparison between the candidate validation partition key and a validation partition key associated with the partition; and
processing the data access request in response to a determination that the candidate validation partition key is valid.

11. The computer-implemented method of claim 10, further comprising:
in response to the determination that the candidate validation partition key is valid, performing a data operation at the partition based at least in part on the data access request.

12. The computer-implemented method of claim 10, further comprising:
in response to a determination that the candidate validation partition key is invalid, discarding the data access request.

13. The computer-implemented method of claim 10, further comprising:
generating the partition in response to a partition generation request, wherein the partition generation request comprises a secret key and is associated with the encrypted context for the requesting entity identifier associated with the partition generation request;
generating the encrypted partition key based at least in part on the secret key and the encrypted context; and
generating one or more relationship mappings between the partition, the partition identifier, the encrypted partition key, and the validation partition key.

14. The computer-implemented method of claim 10, further comprising:
generating the partition in response to a partition generation request, wherein the partition generation request is associated with the encrypted context for a requesting entity identifier associated with the partition generation request;
determining a secret key for the partition generation request;
generating the encrypted partition key based at least in part on the secret key and the encrypted context; and
generating one or more relationship mappings between the partition, the partition identifier, the encrypted partition key, and the validation partition key.

15. The computer-implemented method of claim 10, further comprising:
generating the validation partition key based on a hash mapping between the partition identifier and a secret key associated with a partition generation request.

16. The computer-implemented method of claim 10, further comprising:
generating a decrypted partition key based on the encrypted partition key and the encrypted context;
caching the decrypted partition key in association with the encrypted context;
receiving a second data access request to access data within the partition;
retrieving the cached decrypted partition key;
generating a second candidate validation partition key for the partition based at least in part on the cached decrypted partition key and the partition identifier;
validating the second candidate validation partition key based at least in part on a comparison between the second candidate validation partition key and the validation partition key associated with the partition; and
processing the second data access request in response to a determination that the second candidate validation partition key is valid.

17. The computer-implemented method of claim 10, further comprising:
determining the partition identifier based at least in part on metadata associated with the data access request.

18. A computer program product comprising at least one non-transitory computer readable storage medium having computer executable code portions stored therein, the computer executable code portions comprising program code instructions configured to:
receive a data access request to access data within a partition, wherein the data access request is associated with an encrypted context for a requesting entity identifier associated with the data access request;
identify, based at least in part on the data access request, a partition identifier and an encrypted partition key for the partition;
generate a candidate validation partition key for the partition based at least in part on the encrypted partition key, the encrypted context, and the partition identifier;
validate the candidate validation partition key based at least in part on a comparison between the candidate validation partition key and a validation partition key associated with the partition; and
process the data access request in response to a determination that the candidate validation partition key is valid.

19. The computer program product of claim 18, the program code instructions further configured to:
in response to the determination that the candidate validation partition key is valid, perform a data operation at the partition based at least in part on the data access request.

20. The computer program product of claim 18, the program code instructions further configured to:
  in response to a determination that the candidate validation partition key is invalid, discard the data access request.

\* \* \* \* \*